United States Patent
Mink et al.

(10) Patent No.: US 6,964,937 B2
(45) Date of Patent: Nov. 15, 2005

(54) BIMETALLIC CATALYST FOR PRODUCING POLYETHYLENE RESINS WITH BIMODAL MOLECULAR WEIGHT DISTRIBUTION, ITS PREPARATION AND USE

(75) Inventors: Robert Ivan Mink, Tarrytown, NY (US); Thomas Edward Nowlin, West Windsor, NJ (US); Pradeep P. Shirodkar, Kingwood, TX (US); Gary M. Diamond, San Jose, CA (US); David Bruce Barry, Melbourne (AU); Chunming Wang, Tewksbury, MA (US); Hitesh A. Fruitwala, Houston, TX (US); Shih-May Christine Ong, Warren, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/433,228

(22) PCT Filed: Apr. 10, 2001

(86) PCT No.: PCT/US01/31075

§ 371 (c)(1),
(2), (4) Date: May 29, 2003

(87) PCT Pub. No.: WO02/44222

PCT Pub. Date: Jun. 6, 2002

(65) Prior Publication Data

US 2004/0048736 A1 Mar. 11, 2004

Related U.S. Application Data

(60) Provisional application No. 60/250,317, filed on Nov. 30, 2000.

(51) Int. Cl.$^7$ .......................... C08F 4/602; C08F 4/626; C08F 4/629

(52) U.S. Cl. ...................... 502/113; 502/104; 526/114; 526/116; 526/943

(58) Field of Search ................... 502/113, 104, 502/114; 526/114, 116, 943

(56) References Cited

U.S. PATENT DOCUMENTS

| | | | | |
|---|---|---|---|---|
| 4,634,746 A | * | 1/1987 | Etherton et al. | 526/124.8 |
| 4,742,139 A | * | 5/1988 | Kioka et al. | 526/124.8 |
| 4,870,039 A | * | 9/1989 | Job | 502/104 |
| 5,032,562 A | | 7/1991 | Lo et al. | 502/111 |
| 5,260,245 A | | 11/1993 | Mink et al. | 502/115 |
| 5,539,076 A | | 7/1996 | Nowlin et al. | 526/348.1 |
| 5,614,456 A | | 3/1997 | Mink et al. | 502/115 |

FOREIGN PATENT DOCUMENTS

| | | | | |
|---|---|---|---|---|
| EP | 0 320 145 | * | 11/1988 | |
| EP | 0 768 319 A1 | | 4/1997 | C08F/4/64 |
| EP | 0 893 455 A1 | | 1/1999 | C08F/4/70 |
| WO | WO 97/35891 | | 10/1997 | C08F/4/42 |

* cited by examiner

*Primary Examiner*—Caixia Lu
(74) *Attorney, Agent, or Firm*—Kevin M. Faulkner

(57) ABSTRACT

Bimetallic catalyst for producing polyethylene resins with a bimodal molecular weight distribution, its preparation and use. The catalyst is obtainable by a process which includes contacting a support material with an organomagnesium component and carbonyl-containing component. The support material so treated is contacted with a non-metallocene transition metal component to obtain a catalyst intermediate, the latter being contacted with an aluminoxane component and a metallocene component. This catalyst may be further activated with, e.g., alkylaluminum cocatalyst, and contacted, under polymerization conditions, with ethylene and optionally one or more comonomers, to produce ethylene homo- or copolymers with a bimodal molecular weight distribution and improved resin swell properties in a single reactor. These ethylene polymers are particularly suitable for blow molding applications.

25 Claims, 2 Drawing Sheets

US 6,964,937 B2

BIMETALLIC CATALYST FOR PRODUCING POLYETHYLENE RESINS WITH BIMODAL MOLECULAR WEIGHT DISTRIBUTION, ITS PREPARATION AND USE

CROSS-REFERENCE TO RELATED APPLICATION

The present application claims priority to International Application No. PCT/US01/31075 filed on Oct. 4, 2001, which claims priority to Provisional Application U.S. Ser. No. 60/250,317 filed on Nov. 30, 2000.

BACKGROUND

1. Field of the Invention

The present invention relates to a supported bimetallic catalyst, its preparation and its use in the production of homo- and copolymers of ethylene (polyethylene resins) with a bimodal molecular weight distribution (MWD) in a single reactor. The present invention also relates to polyethylene resins produced with a catalyst that includes the supported bimetallic catalyst.

2. Background

Swell characteristics play an important role in determining the processability of high density polyethylene (HDPE) blow molding resins, such as those used for the manufacture of bottles and similar articles. More particularly, when a polymer is melted and then forced through a small opening (orifice) the polymer may swell (expand) to a diameter larger than the orifice. This phenomenon is commonly referred to as "polymer swell". "Intrinsic swell" is the polymer swell as measured from a polymer sample directly after manufacture. To obtain the intrinsic swell of a polymer sample, the polymer sample must be completely stabilized with an additive package (i.e., compounds that prevent any polymer degradation when the polymer is melted) during the time the swell measurement is being made.

It is known that HDPE blow molding resins are produced in the gas phase and in a single reactor by means of traditional chromium-based catalysts. However, the intrinsic swell of the resulting resins often is too high for commercial applications; i.e., so high that it contributes to, for example, unacceptably high bottle weight, poor bottle handle and fixtures formation, and excessive flash. One option for lowering the swell of such resins is to degrade them in the presence of air along with high stresses and temperature. However, after the swell has been lowered due to polymer degradation, the resin needs to be stabilized with antioxidants to prevent further polymer degradation. Another option for lowering the swell is the use of peroxides having high decomposition temperatures to produce controlled degradation. A potential disadvantage of this technique is that it requires well-controlled downstream processing of the resin, which requires maintenance and adds to the cost of the resin. Both of these controlled degradation techniques can lead to contamination of the resin and/or color and odor problems in the resin. Moreover, these polymer degradation processes slow down the manufacturing rates (polymer output/time unit) and may be difficult to control. On the other hand, if the swell of a particular polymer is too low for commercial applications, nothing can be done to increase swell to the necessary value.

Generally, high performance blow molding resins have a bimodal molecular weight distribution (MWD). As used herein, "resin having a bimodal MWD" means that the resin comprises at least two polymer components, one of the at least two components having a higher average molecular weight (hereinafter sometimes referred to as the "HMW polymer component") than another of the at least two components (hereinafter sometimes referred to as the "LMW polymer component"). Resins with a bimodal MWD can be produced in a single reactor using the technology disclosed in, for example, U.S. Pat. No. 5,539,076, discussed below, or by the use of a series of reactors or reaction steps. For example, bimodal MWD polyethylene resins can be produced in tandem slurry processes, but often suffer from low intrinsic swell. Low intrinsic swell leads to problems with webbing in the bottle, poor formation of handles and bottle fixtures, and bottle extrusion problems.

U.S. Pat. No. 5,032,562 to Lo et al. discloses a supported olefin polymerization catalyst composition comprising a precursor and a catalyst activator. The catalyst is used in the presence of small amounts of hydrogen to produce polyolefins having a multimodal MWD in a single reactor. The catalyst comprises a dialkylmagnesium component, a zirconocene and a non-metallocene titanium and/or vanadium compound. It is mentioned that the precursor may optionally also include an organic compound, suitable examples thereof being alcohols, ketones, esters, acids or organic silicates. Alcohols, such as 1-butanol, are stated to be the preferred organic compounds.

U.S. Pat. No. 5,539,076 to Nowlin et al. discloses resins which are in situ catalytically produced polyethylene resin blends of a broad bimodal MWD that can be processed into films on existing equipment and exhibit good processability in blown film production and reduced tendency towards die-lip buildup and smoking in on-line operations. The preferred catalyst for producing these resins comprises a catalyst including a support treated with a dialkylmagnesium compound, an aluminoxane, at least one metallocene and a non-metallocene transition metal source as well as an alkylaluminum compound, e.g., trimethylaluminum (TMA), as cocatalyst.

U.S. Pat. No. 5,614,456 to Mink et al. is directed to an activated catalyst composition for producing bimodal MWD high density and linear low density polyethylene resins, which activated catalyst does not require an alkylaluminum cocatalyst. A preferred catalyst comprises, as support, silica impregnated with a dialkylmagnesium compound and an organic alcohol reagent, e.g., butanol. The support is contacted with at least two transition metal compounds, at least one of which is a metallocene, e.g., zirconocene, and, as activator, aluminoxane, either alone or admixed with the metallocene compound.

U.S. Pat. No. 5,260,245 to Mink et al. describes a catalyst for producing higher flow index linear low density polyethylene with relatively narrower molecular weight distributions. The catalyst is formed by treating silica having reactive OH groups with a dialkylmagnesium compound and a carbonyl-containing compound to form an intermediate which is subsequently treated with a transition metal compound to form a catalyst precursor. The catalyst precursor is activated with triethylaluminum.

PCT publication WO 97/35891 is directed to a process of forming a bimetallic catalyst composition comprising a cocatalyst and a catalyst precursor. The precursor comprises at least two transition metals; a metallocene complex is a source of one of said two transition metals. The precursor is produced in a single-pot process by contacting a porous carrier, in sequence, with a dialkylmagnesium compound, an aliphatic alcohol, a non-metallocene transition metal compound, a contact product of a metallocene complex and a trialkylaluminum compound, and methylalumoxane.

SUMMARY

One embodiment of the present invention involves supported bimetallic catalysts which can be used for the production of polyethylene resins of bimodal MWD in a single reactor, which resins are especially suitable for blow molding applications. The catalysts can be used to control resin swell (in the following the terms "polymer swell" and "resin swell" will be used interchangeably) over a wide and commercially significant range and are able to produce resins with the desired swell characteristics. Also, the catalysts can be used without the need for additional processing-induced resin modification; i.e., resin swell does not have to be lowered to a commercially acceptable level.

Another embodiment of the present invention is directed to the polyethylene resins produced with corresponding catalysts. These resins can be used to advantage in a wide range of applications, for example, blow molding large part blow molding, pipe and pressure pipe applications.

In one aspect the present invention relates to a process for making a supported bimetallic catalyst that is suitable for use in the production of homopolymers and copolymers of ethylene with a bimodal molecular weight distribution in a single reactor. The process comprises contacting a support material with an organomagnesium component and at least one carbonyl-containing component selected from aldehydes and ketones, whereafter the support material is contacted with a non-metallocene transition metal component to obtain a catalyst intermediate. This intermediate is contacted with at least one aluminoxane and at least one metallocene component to prepare the final bimetallic catalyst.

In one embodiment, the support material is a solid, particulate material. The solid particulate material may be silica.

In another embodiment, the organomagnesium component comprises a compound of the general formula (I):

$$R^1_m MgR^2_n \tag{I}$$

wherein $R^1$ and $R^2$ are the same or different alkyl groups each containing about 2 to about 12 carbon atoms, preferably about 4 to about 8 carbon atoms, and m and n are each 0, 1 or 2, provided that the sum (m+n) is equal to the valence of Mg, a specific example of such a dialkylmagnesium component being dibutylmagnesium.

According to another embodiment, the carbonyl-containing component comprises at least one compound of the general formula (II):

$$R^3—CO—R^4 \tag{II}$$

wherein $R^3$ and $R^4$ are independently selected from optionally substituted aliphatic groups, e.g., aliphatic groups containing 1 to about 20 carbon atoms, optionally substituted cycloaliphatic groups, e.g., cycloaliphatic groups containing about 5 to about 8 carbon atoms, and optionally substituted aromatic groups, e.g., aromatic groups containing about 6 to about 20 carbon atoms, and $R^4$ can additionally be hydrogen. Specific examples of such carbonyl-containing components include benzaldehyde, p-tolualdehyde, salicylaldehyde, butylaldehyde, 2-pentanone and 3'-methylacetophenone.

In a further embodiment, the non-metallocene transition metal component comprises at least one compound that contains a Group IV or V transition metal, e.g., titanium and/or vanadium. The non-metallocene transition metal component may also include halogen. The non-metallocene transition metal component may be a tetravalent titanium compound, e.g., titanium tetrachloride.

According to still another embodiment, the metallocene compound comprises at least one compound of the general formula (III):

$$Cp_xMA_y \tag{III}$$

wherein x is at least 1, M is titanium, zirconium or hafnium; Cp represents optionally substituted cyclopentadienyl, e.g., unsubstituted cyclopentadienyl or cyclopentadienyl substituted by an alkyl group containing 1 to about 8 carbon atoms (such as n-butylcyclopentadienyl); optionally substituted cyclopentadienyl that is part of a bicyclic or tricyclic moiety; or, when x is 2, the cyclopentadienyl moieties may be linked by a bridging group. A is selected from halogen atom, hydrogen atom, alkyl group and combinations thereof, and the sum (x+y) is equal to the valence of M. For example, M may represent Zr, A may represent halogen and x may equal 2. Specific examples of metallocene components of the above general formula are bis(cyclopentadienyl)zirconium dichloride and bis(n-butylcyclopentadienyl) zirconium dichloride.

In yet another embodiment, the aluminoxane is selected from methylalunminoxane (MAO), modified methylaluminoxanes (MMAO) and mixtures thereof, and may particularly be MAO.

Regarding the relative proportions of the various reagents for making the bimetallic catalyst, according to one embodiment, the molar ratio of dialkylmagnesium component to carbonyl-containing component is from about 1:5 to about 15:1. In another embodiment, the atomic ratio of Mg in the dialkylmagnesium component to transition metal in the non-metallocene transition metal component is in the range from about 0.5:1 to about 5:1. In still another embodiment, the atomic ratio of transition metal in the non-metallocene transition metal component to metal in the metallocene component ranges from about 1:1 to about.30:1. According to a further embodiment, the atomic ratio of metal in the metallocene component to Al in the aluminoxane ranges from about 1:10 to about 1:1000.

Another aspect of the present invention is a process for making a supported bimetallic catalyst suitable for use in the production of homopolymers and copolymers of ethylene with a bimodal molecular weight distribution in a single reactor, which process comprises providing a slurry of silica calcined at a temperature from about 200° C. to about 850° C. in a non-polar liquid medium (in the following, the terms "non-polar liquid medium" and "non-polar solvent" will be used interchangeably) and adding to the slurry a dialkylmagnesium component whose alkyl groups each contain about 4 to about 8 carbon atoms. To the resulting slurry there is added at least one carbonyl-containing component selected from benzaldehyde, p-tolualdehyde, salicylaldehyde, butylaldehyde, 2-pentanone and 3'-methyl acetophenone, the amount of added carbonyl-containing component being such as to afford a molar ratio of dialkylmagnesium component to carbonyl-containing component of about 1:1 to about 2:1. Subsequent addition of titanium tetrachloride results in the formation of a slurry of a catalyst intermediate in a non-polar solvent, from which the liquid phase is removed to obtain a substantially dry, free-flowing intermediate catalyst. A slurry of this catalyst intermediate in a non-polar solvent is prepared. Next, a solution formed by contacting a zirconocene compound with methylaluminoxane in an aromatic solvent is added to the intermediate-containing slurry, which results in the formation of a slurry of a bimetallic catalyst. The bimetallic catalyst is recovered from the slurry by separating the liquid phase from the catalyst.

Another aspect of the present invention is formed by the supported bimetallic catalyst that is obtainable by the above process. In one embodiment, the catalyst comprises a solid support which includes at least one non-metallocene transition metal source, at least one metallocene component, and at least one aluminoxane, the support treated with an organomagnesium component and at least one carbonyl-containing component selected from aldehydes and ketones.

The present invention also relates to a catalyst composition including the above-described catalyst and a cocatalyst. In one embodiment, the cocatalyst comprises at least one compound of the general formula (IV):

$$R^5{}_a AlX_b \qquad (IV)$$

wherein a is 1, 2 or 3, $R^5$ is an alkyl group containing 1 to about 10 carbon atoms, X represents hydrogen or halogen and b is 0, 1 or 2, provided that the sum (a+b) is 3.

Another aspect of the present invention is a process for producing a homopolymer or copolymer of ethylene having a bimodal MWD and produced in a single reactor with a bimetallic catalyst as described above, as well as the ethylene polymers produced thereby. The process comprises contacting ethylene and optionally one or more comonomers under polymerization conditions, e.g., in the gas phase, with the bimetallic catalyst. The copolymer of ethylene may be a copolymer of ethylene and at least one α-olefin having about 3 to about 10 carbon atoms such as, e.g., 1-hexene.

The ethylene polymers of the present invention may have an annular die swell at a shear rate of 210 s$^{-1}$ of about 0.3 g to about 0.5 g and an annular die swell at a shear rate of 6300 s$^{-1}$ of about 0.55 g to about 0.95 g. They may also have a density in the range of about 0.915 to about 0.970 g/cm$^3$ and may particularly be high density polyethylenes. In another embodiment, the ethylene polymers may have a flow index (FI) in the range of about 1 g/10 min to about 100 g/10 min. Also, they may comprise deactivated catalyst.

The present invention also relates to a blow molded article produced from the ethylene polymers of the present invention such as, e.g., a bottle.

BRIEF DESCRIPTION OF THE DRAWINGS

The present invention is further described in the detailed description which follows, in reference to the drawings by way of non-limiting examples of exemplary embodiments of the present invention. In the drawings.

DETAILED DESCRIPTION

Figure 1:
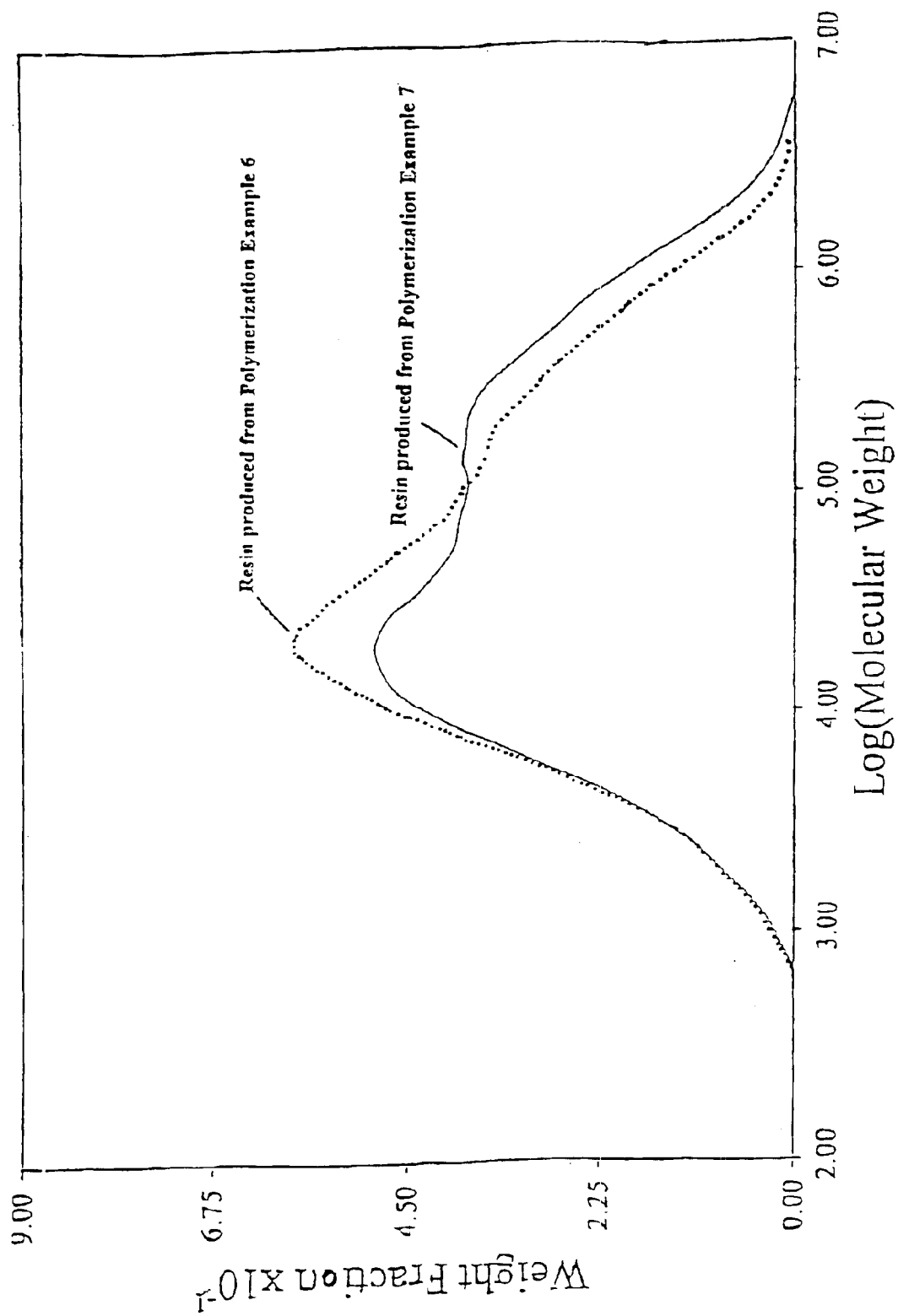
FIG. 1 shows a GPC curve of the resins produced in Polymerization Examples 6 and 7.

The particulars shown herein are by way of example and for purposes of illustrative discussion of the embodiments of the present invention only, and are presented to provide what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component includes the compound or component by itself, as well as in combination with other compounds or components, such as mixtures of compounds (e.g., mixtures of isomers).

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

A preferred synthesis of the supported bimetallic catalyst of the present invention comprises two stages: synthesis of the supported catalyst intermediate (preferably in the given order of consecutive steps and without isolation of a dry product until after the incorporation of the non-metallocene transition metal compound); and synthesis of the final supported catalyst. Thus the synthesis is preferably carried out in a series of several consecutive steps under inert conditions in the substantial absence of water and molecular oxygen.

According to this preferred synthesis, support material is first slurried in a non-polar solvent. Support materials for preparing the bimetallic catalysts of the present invention comprise solid, particulate, porous materials and may include support materials disclosed in U.S. Pat. No. 4,173, 547. Such support materials include, but are not limited to, metal oxides, hydroxides, halides or other metal salts, such as sulfates, carbonates, phosphates, silicates, and combinations thereof, and may be amorphous or crystalline. Some preferred support materials include silica, alumina and combinations thereof. Support material particles may have any shape, and are preferably approximately spherical (such as are obtainable, for example, by spray-drying).

Preferred support materials comprise particles, the optimum size of which can easily be established by one of ordinary skill in the art. A support material that is too coarse may lead to unfavorable results, such as low bulk density of the resulting polymer powder. Thus, preferred support materials comprise particles with average size, e.g., diameter, smaller than about 250 μm, more preferably smaller than about 200 μm, most preferably smaller than about 80 μm. Preferred support materials comprise particles larger than about 0.1 μm, more preferably larger than about 10 μm in size, because smaller silica particles may produce small polymer particles (fines) which may cause reactor instability.

Support material is preferably porous, as porosity increases the surface area of the support material, which, in turn, provides more sites for reaction. The specific surface areas may be measured in accordance with British Standards BS 4359, volume 1 (1969). The specific surface area of support material used in accordance with the present invention is preferably at least about 3 m$^2$/g, more preferably at least about 50 m$^2$/g, and most preferably at least about 150 m$^2$/g, e.g., about 300 m$^2$/g. There is no preferred upper limit to support material specific surface area. Without limiting the present invention, the specific surface area of support material is generally less than about 1500 m$^2$/g.

The internal porosity of support material may be measured as the ratio between the pore volume and the weight of the material and can be determined by the BET technique, such as described by Brunauer et al., *J. Am. Chem. Soc.*, 60, pp. 209–319 (1938). The internal porosity of support material is preferably larger than about 0.2 cm$^3$/g, more preferably larger than about 0.6 cm$^3$/g. There is no preferred upper limit to support material internal porosity, which, as a practical matter, is limited by particle size and internal pore diameter. Thus, without limiting the present invention, internal porosity is generally less than about 2.0 cm³/g.

Preferred support materials for use in the present invention comprise silica, particularly amorphous silica, and most preferably high surface area amorphous silica. Such support materials are commercially available from a number of sources, and include a material marketed under the tradenames of Davison 952 or Davison 955 by the Davison Chemical Division of W.R. Grace and Company, or Crosfield ES70 by Crosfield Limited (surface area=300 m²/g; pore volume 1.65 cm³/g). The silica is in the form of spherical particles, which are obtained by a spray-drying process. As procured, these silicas are not calcined (dehydrated).

Because organometallic components used in the preparation of the catalysts and catalyst compositions of the present invention may react with water, the support material should preferably be substantially dry. Water that is physically bound to the support material, therefore, is preferably removed, such as by calcination, prior to forming a bimetallic catalyst according to the present invention.

Preferred calcined support materials comprise support material that has been calcined at a temperature higher than about 100° C., more preferably higher than about 150° C., even more preferably higher than about 200° C., e.g., higher than about 250° C. As sintering of the support material is preferably avoided, calcination is preferably effected at a temperature that is below the sintering temperature of the support material. Calcination of a support material, e.g., silica, is conveniently carried out at a temperature of not higher than about 850° C., e.g., not higher than about 650° C. Exemplary calcination temperatures are about 300° C., about 600° C., and about 800° C. Total calcination times usually are not shorter than about 4 hours, preferably not shorter than about 6 hours, whereas calcination times longer than 24 hours, or even longer than 12 hours offer no particular advantage.

Calcination of support material can be performed using any procedure known to those of ordinary skill in the art, and the present invention is not limited by the calcination method. A preferred method of calcination is disclosed by T. E. Nowlin et al., "Ziegler-Natta Catalysts on Silica for Ethylene Polymerization," *J. Polym. Sci., Part A: Polymer Chemistry*, vol. 29, 1167–1173 (1991).

As used in this disclosure, support material as used in the Examples below may, for example, be prepared as follows. In a fluidized-bed, silica (e.g., Davison 955), is heated in steps from ambient temperature to the desired calcining temperature (e.g., 600° C.). The silica is maintained at about this temperature for about 4 to about 16 hours, after which it is allowed to cool to ambient temperature. The calcination temperature primarily affects the number of OH groups on the support surface; i.e., the number of OH groups on the support surface (silanol groups in the case of silica) is approximately inversely proportional to the temperature of drying or dehydration: the higher the temperature the lower the hydroxyl group content. In other words, at each calcination temperature the support (e.g., silica) reaches a certain OH concentration, after which additional heating has no further effect on the OH concentration.

The slurry of the support material in the non-polar solvent is prepared by introducing the support material into the solvent, preferably while stirring, and heating the mixture to about 25 to about 70° C., preferably to about 40 to about 60° C. The most suitable non-polar solvents are materials which are liquid at reaction temperatures and in which all of the reactants used later during the catalyst preparation, i.e., organomagnesium components, carbonyl-containing components and transition metal components, are at least partially soluble. Preferred non-polar solvents are alkanes, particularly those containing about 5 to about 10 carbon atoms, such as isopentane, hexane, isohexane, n-heptane, isoheptane, octane, nonane, and decane. However, other materials, including cycloalkanes, particularly those containing about 5 to about 10 carbon atoms, such as cyclohexane and methylcyclohexane, and aromatic solvents, particularly those containing about 6 to about 12 carbon atoms, such as benzene, toluene, ethylbenzene and the xylenes, may also be used. Of course, it is also possible to use solvent mixtures. The preferred non-polar solvents are isopentane and isohexane, with isopentane being particularly preferred (due to its low boiling point which makes its removal convenient and fast).

Prior to use, the non-polar solvent should be purified, such as by percolation through silica gel and/or molecular sieves, to remove traces of water, molecular oxygen, polar compounds, and other materials capable of adversely affecting catalyst activity. It is to be noted that the temperature of the slurry before addition of the non-metallocene transition metal component should not be in excess of 90° C., since otherwise a deactivation of the transition metal component is likely to result. Accordingly, all catalyst synthesis steps are preferably carried out at a temperature below 90° C., even more preferable below 80° C.

Following the preparation of a slurry of the support material in a non-polar solvent, the slurry is contacted with an organomagnesium component.

Preferred organomagnesium components for use in the present invention include dialkylmagnesium components of the general formula (I):

$$R^1{}_m MgR^2{}_n \qquad (I)$$

wherein $R^1$ and $R^2$ are the same or different branched or unbranched alkyl groups containing about 2 to about 12 carbon atoms, preferably about 4 to about 10 carbon atoms, and even more preferably about 4 to about 8 carbon atoms, and m and n are each 0, 1 or 2, provided that the sum (m+n) is equal to the valence of Mg. The most preferred dialkylmagnesium component for use in the present invention is dibutylmagnesium. Of course, it is also possible to use more than one organomagnesium component, e.g., two different organomagnesium components.

The purpose of the organomagnesium component is to increase the activity of the catalyst. For a better understanding of the role of the organomagnesium component for the performance of polymerization catalysts such as those disclosed herein, reference may be made to the above-mentioned article by T. E. Nowlin et al. in *J. Polym. Sci.: Part A: Polymer Chemistry*, Vol. 29, 1167–1173 (1991). The amount of organomagnesium component will generally be greater than about 0.3 mmol/g, more preferably greater than about 0.5 mmol/g, even more preferably greater than 0.7 mmol/g, where the amount of organomagnesium component is given as mmol Mg/g of support material. In the synthesis of the catalyst of the present invention, it is desirable to add not more organomagnesium component than will be deposited—physically or chemically—into the support, since any excess of the organomagnesium component in the liquid phase may react with other chemicals used for the catalyst synthesis and cause precipitation outside of the support. The drying temperature of the support materials affects the number of sites on the support available for the dialkylmagnesium component: the higher the drying temperature the lower the number of sites. Thus, the exact ratio of organomagnesium component to support will vary and should be determined on a case-by-case basis to assure that preferably only so much of the organomagnesium component is added to the slurry as will be deposited into the support without leaving excess organomagnesium component in the liquid phase. Thus the ratios given below are intended only as an approximate guideline, and the exact amount of organomagnesium component is to be controlled by the functional limitation discussed above; i.e., it should preferably not be greater than that which can completely be deposited into the support. The appropriate amount of the organomagnesium component can be determined in any conventional manner, e.g., by adding the organomagnesium component to the slurry of the support material until free organomagnesium component is detected in the liquid phase (e.g., by taking a sample of the liquid phase and analyzing it for Mg by one of several analytical procedures known to one of ordinary skill in the art). If organomagnesium component is added in excess of the amount deposited into the support material, it can be removed, e.g., by filtration and washing of the support material. However, this is less desirable than the embodiment described above.

For example, for the silica support heated at about 600° C., the amount of the organomagnesium component added to the slurry will generally be less than about 1.7 mmol/g, preferably less than about 1.4 mmol/g, even more preferably less than about 1.1 mmol/g.

The treatment of the support material with the organomagnesium component can in principle be carried out at any temperature at which the organomagnesium component is stable. The contacting of the slurry of the support material in a non-polar solvent with the organomagnesium component will generally be carried out at a temperature between room temperature (e.g., 20° C.) and 80° C. Preferably, the addition is carried out at slightly elevated temperature, e.g., at a temperature of at least about 30° C., even more preferably at least about 40° C. After the addition of the organomagnesium component is complete, the slurry will usually be stirred, preferably at about the temperature of addition, for a sufficient time to allow the organomagnesium component to react and/or interact with the support material substantially completely. Generally, this time will be not less than about 0.1 hours, preferably not less than about 0.5 hours, although stirring for more than about 2.0 hours will not bring about any significant further reaction/interaction.

Next, the support treated with the organomagnesium component is contacted with a carbonyl-containing component, i.e., an aldehyde and/or ketone. The carbonyl-containing component is used to modify the non-metallocene transition metal component of the bimetallic catalyst of the present invention. Because the non-metallocene transition metal catalyst component produces the HMW polymer component of the polyethylene resin with a bimodal MWD, the carbonyl-containing component has a direct effect on the polymer properties of the HMW polymer component. Different carbonyl-containing components afford different results (to a certain extent) with regard to the weight fraction, the average molecular weight and the MWD of the HMW polymer component. These results can readily be established by one of ordinary skill in the art.

Preferred aldehydes/ketones for use in the present invention are those of the general formula (II):

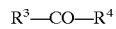

$$R^3-CO-R^4 \qquad (II)$$

wherein $R^3$ and $R^4$ are independently selected from optionally substituted, branched or unbranched, saturated or unsaturated (and preferably saturated) aliphatic groups, optionally substituted cycloaliphatic groups (saturated or unsaturated) and optionally substituted aromatic groups, and $R^4$ can additionally be hydrogen.

The aliphatic groups will usually contain 1 to about 20 carbon atoms, more often 1 to about 10 carbon atoms and particularly 1 to about 6 carbon atoms. Non-limiting examples thereof are methyl, ethyl, vinyl, propyl, isopropyl, allyl, n-butyl, isobutyl, pentyl and hexyl. The optional substituents of said aliphatic groups can be any radicals which do not adversely affect the performance of the catalyst.

The above cycloaliphatic groups generally contain about 5 to about 8 carbon atoms, particularly about 5 to about 7 carbon atoms, not including the carbon atoms of one or more aliphatic groups (usually having 1 to 4 carbon atoms) that may be linked thereto. Non-limiting examples of cycloaliphatic groups $R^3$ and $R^4$ are cyclopentyl, cyclohexyl, cyclooctyl, methylcyclopentyl and methylcyclohexyl.

The above aromatic groups usually will have about 6 to about 20 carbon atoms, particularly about 6 to about 12 carbon atoms. As used herein and in the appended claims, the term "aromatic groups" is meant to also include heteroaromatic groups in which one or more carbon atoms of the aromatic ring system are replaced by a heteroatom, particularly N, O and/or S. Non-limiting examples of aromatic groups $R^3$ and $R^4$ suitable for use in the present invention include phenyl, benzyl, tolyl, xylyl, ethylbenzyl, hydroxyphenyl, chlorophenyl, dichlorophenyl, naphthyl, methylnaphthyl, furyl, pyrrolyl, pyridinyl and thienyl, although the present invention is not limited to these examples.

Non-limiting examples of specific components of general formula (II) above are benzaldehyde, (o-, m- and p-)tolualdehyde, dimethylbenzaldehydes, trimethylbenaldehydes, tetramethylbenzaldehydes, pentamethylbenzaldehyde, ethylbenzaldehydes, triethylbenzaldehydes, triisopropylbenzaldehydes, salicylaldehyde, anisaldehyde, furfural, pyrrolaldehydes, acetaldehyde, propionaldehyde, butyraldehyde, valeraldehyde, isovaleraldehyde, acetone, butanone, 2-pentanone, 3-pentanone, 2,6-dimethyl-4-pentanone, acetophenone, methylacetophenone, and benzophenone. Ethylenically unsaturated carbonyl-containing components (such as mesityl oxide, acrolein and the like) may also be employed for the purposes of the present invention. It is also possible to use more than one carbonyl-containing component, e.g., two aldehydes, one aldehyde and one ketone, or two ketones. Usually only one single carbonyl-containing component (or an isomeric mixture thereof) will be employed. Benzaldehyde and tolualdehyde (both the individual isomers and isomer mixtures) are particularly preferred carbonyl-containing components for use in the preparation of the bimetallic catalyst of the present invention.

The amount of carbonyl-containing component employed is preferably such that it will react substantially completely with the organomagnesium/support intermediate material formed after the addition of the organomagnesium component to the slurried support material. Generally the molar ratio of organomagnesium component (e.g., dialkylmagnesium component) to carbonyl-containing component will be at least about 1:5, more preferably at least about 1:2, and most preferred at least about 1:1. On the other hand it is preferred that said ratio is not higher than about 15:1, particularly not higher than about 10:1, with a ratio of not higher than about 6:1, e.g., not higher than 2:1, being particularly preferred. Without wishing to be bound by any theory, it is assumed that one molecule of Mg species reacts/interacts with one molecule of carbonyl-containing component.

Regarding the temperature at which the carbonyl-containing component is added to the slurry of support material treated with the organomagnesium component, there are no particular restrictions besides the thermal stability of the materials involved. Generally, the addition will be carried out at a temperature between room temperature and the boiling point of the non-polar solvent of the slurry. As a matter of convenience the temperature will preferably be about the same as that at which the organomagnesium component was added and at which the slurry of organomagnesium component-treated support material was stirred before the addition of the carbonyl-containing component, respectively. Following the addition of the carbonyl-containing component, the slurry will generally be stirred, preferably at about the temperature of addition, for a time period that is sufficient to allow the carbonyl-containing component to substantially completely react/interact with the organomagnesium component-treated support material. The stirring time is generally at least about 0.5 hours, preferably at least about 1.0 hour, although stirring for more than about 2.0 hours usually does not bring about any significant further reaction/interaction.

After the reaction/interaction with the carbonyl-containing component, the resulting slurry of support material is contacted with one or more (preferably one) non-metallocene transition metal component. During this step, the slurry temperature is preferably maintained at about 25 to about 70° C., particularly at about 40 to about 60° C. As noted above, temperatures in the slurry of about 90° C. or greater are likely to result in deactivation of the non-metallocene transition metal source. Suitable transition metal components used herein include those of elements of Groups IV and V of the Periodic Table, particularly titanium-containing and vanadium-containing compounds, provided that these compounds are at least somewhat soluble in non-polar solvents. Non-limiting examples of such compounds are titanium and vanadium halides, e.g., titanium tetrachloride, vanadium tetrachloride, vanadium oxytrichloride, titanium and vanadium alkoxides, wherein the alkoxide moiety has a branched or unbranched alkyl radical of 1 to about 20 carbon atoms, preferably 1 to about 10 carbon atoms, and even more preferably 1 to about 6 carbon atoms (e.g., methoxy, ethoxy, propoxy and isopropoxy). The preferred transition metal components are titanium-containing compounds, particularly tetravalent titanium-containing compounds. The most preferred titanium compound is $TiCl_4$.

The amount of non-metallocene transition metal component(s) employed is at least in part determined by the desired ratio of HMW polymer component to LMW polymer component in the polyethylene resin with a bimodal molecular weight distribution to be produced with the bimetallic catalyst according to the present invention. In other words, because the non-metallocene transition metal catalyst component will produce the HMW polymer component and the metallocene catalyst component will produce the LMW polymer component, under otherwise identical polymerization conditions the ratio of HMW polymer component to LMW polymer component in the resulting polyethylene resin will increase with increasing molar ratio of non-metallocene transition metal component(s) to metallocene component(s) employed for the preparation of the supported bimetallic catalyst. The total amount of catalyst components, on the other hand, is limited by the capability of the specific support material employed to accommodate the catalyst components. Generally, however, the non-metallocene transition metal is employed in an amount that results in an atomic ratio of Mg of the organomagnesium component (e.g., dialkylmagnesium component employed to treat the support) to transition metal(s) in the non-metallocene transition metal component(s) of at least about 0.5:1, more preferably at least about 1:1, and most preferred at least about 1.7:1. On the other hand it is preferred that said ratio is not higher than about 5:1, particularly not higher than about 3:1, with a ratio of not higher than about 2:1 being particularly preferred.

As already mentioned above, mixtures of non-metallocene transition metal components may also be used and generally, no restrictions are imposed on the non-metallocene transition metal components which may be included. Any non-metallocene transition metal component that may be used alone may also be used in conjunction with other non-metallocene transition metal components.

After the addition of the non-metallocene transition metal component(s) is complete, in one embodiment of the catalyst synthesis, the slurry solvent is removed, e.g., by evaporation and/or filtration, to obtain a preferably free-flowing powder of a catalyst intermediate.

Next, incorporation of the metallocene component can be undertaken. The metallocene component is activated with an aluminoxane.

Preferred metallocene components for use in the present invention have the general formula (III):

$$Cp_xMA_y \qquad (III)$$

wherein x is at least 1, M is titanium, zirconium or hafnium, and Cp represents unsubstituted, mono- or polysubstituted cyclopentadienyl, unsubstituted, mono- or polysubstituted cyclopentadienyl that is part of a bicyclic or tricyclic moiety or, when x is 2, the cyclopentadienyl moieties may be linked by a bridging group. A represents halogen atom, hydrogen atom, alkyl group or combinations thereof, and the sum (x+y) is equal to the valence of M.

In the above formula of the metallocene component, the preferred transition metal atom M is zirconium. The substituents, on the cyclopentadienyl group, if present, will usually be (preferably straight-chain) alkyl groups having 1 to about 6 carbon atoms, such as, e.g., methyl, ethyl, propyl, n-butyl, n-pentyl and n-hexyl. The cyclopentadienyl group can also be part of an (optionally substituted) bicyclic or tricyclic moiety such as indenyl, tetrahydroindenyl, fluorenyl or a partially hydrogenated fluorenyl group. When the value of x in the above general formula is equal to 2, the cyclopentadienyl groups can also be bridged, for example, by polymethylene or dialklylsilyl groups, such as —$CH_2$—, —$CH_2$—$CH_2$—, —CR'R"— and —CR'R"—CRR"— where R' and R" are lower (e.g., $C_1$–$C_4$) alkyl groups or hydrogen atoms, —$Si(CH_3)_2$—, —$Si(CH_3)_2$—$CH_2$—$CH_2$—$Si(CH_3)_2$— and similar bridge groups. If A in the above formula represents halogen it represents F, Cl, Br and/or I and is preferably chlorine. If A represents an alkyl group, the alkyl group preferably is a straight-chain or branched alkyl group containing 1 to about 8 carbon atoms, such as methyl, ethyl, propyl, isopropyl, n-butyl, isobutyl, n-pentyl, n-hexyl and n-octyl. Of course, if in the above general formula x is equal to or greater than 2 the groups Cp may be the same or different. The same applies if y is equal to or greater than 2 with respect to the groups A which may also be the same or different in that case.

Particularly suitable metallocene components for use in the preparation of the bimetallic catalyst of the present invention include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is preferably zirconium or hafnium, the halide groups are preferably chlorine and the alkyl groups (including cycloalkyl groups) preferably have 1 to about 6 carbon atoms. Illustrative, non-limiting examples of corresponding metallocenes include:

bis(indenyl)zirconium dichloride;
bis(indenyl)zirconium dibromide;
bis(indenyl)zirconium bis(p-toluenesulfonate);
bis(4,5,6,7-tetrahydroindenyl)zirconium dichloride;
bis(fluorenyl)zirconium dichloride;
ethylenebis(indenyl)zirconium dichloride;
ethylenebis(indenyl)zirconium dibromide;
ethylenebis(indenyl)dimethylzirconium;
ethylenebis(indenyl)diphenylzirconium;
ethylenebis(indenyl)methylzirconium chloride;
ethylenebis(indenyl)zirconium bis(methanesulfonate);
ethylenebis(indenyl)zirconium bis(p-toluenesulfonate);
ethylenebis(indenyl)zirconium bis(trifluoromethansulfonate);
ethylenebis(4,5,6,7-tetrahydroindenyl)zirconium dichloride;
isopropylidene(cyclopentadienyl)(fluorenyl)zirconium dichloride;
isopropylidene(cyclopentadienyl)(methylcyclopentadienyl)zirconium dichloride;
dimethylsilylbis(cyclopentadienyl)zirconium dichloride;
dimethylsilylbis(methylcyclopentadienyl)zirconium dichloride;
dimethylsilylbis(dimethylcyclopentadienyl)zirconium dichloride;
dimethylsilylbis(trimethylcyclopentadienyl)zirconium dichloride;
dimethylsilylbis(indenyl)zirconium dichloride;
dimethylsilylbis(indenyl)zirconium bis(trifluoromethanesulfonate);
dimethylsilylbis(4,5,6,7-tetrahydroindenyl)zirconium dichloride;
dimethylsilyl(cyclopentadienyl)(fluorenyl)zirconium dichloride;
diphenylsilylbis(indenyl)zirconium dichloride;
methylphenylsilylbis(indenyl)zirconium dichloride;
bis(cyclopentadienyl)zirconium dichloride;
bis(cyclopentadienyl)zirconium dibromide;
bis(cyclopentadienyl)methylzirconium chloride;
bis(cyclopentadienyl)ethylzirconium chloride;
bis(cyclopentadienyl)cyclohexylzirconium chloride;
bis(cyclopentadienyl)phenylzirconium chloride;
bis(cyclopentadienyl)benzylzirconium chloride;
bis(cyclopentadienyl)zirconium chloride monohydride;
bis(cyclopentadienyl)hafnium chloride monohydride;
bis(cyclopentadienyl)methylzirconium hydride;
bis(cyclopentadienyl)dimethylzirconium;
bis(cyclopentadienyl)dimethylhafnium;
bis(cyclopentadienyl)diphenylzirconium;
bis(cyclopentadienyl)dibenzylzirconium;
bis(cyclopentadienyl)methoxyzirconium chloride;
bis(cyclopentadienyl)ethoxyzirconium chloride;
bis(cyclopentadienyl)zirconium bis(methanesulfonate);
bis(cyclopentadienyl)zirconium bis(p-toluenesulfonate);
bis(cyclopentadienyl)zirconium bis(trifluoromethanesulfonate);
bis(methylcyclopentadienyl)zirconium dichloride;
bis(dimethylcyclopentadienyl)zirconium dichloride;
bis(trimethylcyclopentadienyl)zirconium dichloride;
bis(tetramethylcyclopentadienyl)zirconium dichloride;
bis(pentamethylcyclopentadienyl)zirconium dichloride;
bis(hexylcyclopentadienyl)zirconium dichloride;
bis(dimethylcyclopentadienyl)ethoxyzirconium chloride;
bis(dimethylcyclopentadienyl)zirconium bis(trifluoromethanesulfonate);
bis(ethylcyclopentadienyl)zirconium dichloride;
bis(methylethylcyclopentadienyl)zirconium dichloride;
bis(propylcyclopentadienyl)zirconium dichloride;
bis(methylpropylcyclopentadienyl)zirconium dichloride;
bis(n-butylcyclopentadienyl)zirconium dichloride;
bis(n-butylcyclopentadienyl)hafnium dichloride;
bis(methylbutylcyclopentadienyl)zirconium bis(methanesulfonate);
bis(trimethylsilylcyclopentadienyl)zirconium dichloride;
bis(n-butylcyclopentadienyl)hafnium monochloride monohydride;
bis(n-butylcyclopentadienyl)zirconium monochloride monohydride;
bis(cyclopentadienyl)hafnium dichloride;
bis(cyclopentadienyl)dimethylhafnium;
bis(n-butylcyclopentadienyl)zirconium dichloride;
bis(n-butylcyclopentadienyl)dimethylzirconium;
bis(n-butylcyclopentadienyl)dimethylhafnium;
bis(pentamethylcyclopentadienyl)hafnium dichloride;
bis(n-propylcyclopentadienyl)zirconium dichloride;
bis(n-propylcyclopentadienyl)dimethylzirconium;
bis(1,3-methyl-butyl-cyclopentadienyl)zirconium dichloride;
bis(1,3-methyl-butyl-cyclopentadienyl)dimethylzirconium; and
cyclopentadienylzirconium trichloride.

Of these, bis(cyclopentadienyl)zirconium dichloride and bis(n-butylcyclopentadienyl) zirconium dichloride are preferred metallocene components for use in the present invention.

Of course, mixtures of metallocene components may also be used and generally, no restrictions are imposed on the metallocene components which may be included. Any metallocene component that may be used alone may also be used in conjunction with other metallocene components. Moreover, as already explained above the amount of metallocene component(s) employed is such that it results in the desired ratio of HMW polymer component to LMW polymer component in the polyethylene resin with a bimodal MWD to be produced, which ratio in turn is at least in part determined by the atomic ratio of metal(s) of the non-metallocene transition metal component(s) to metal(s) of the metallocene component(s). Generally the atomic ratio is at least about 1:1, more preferably at least about 2:1 or at least about 3:1, and most preferred at least about 4:1. On the other hand the ratio is generally not higher than about 30:1, preferably not higher than about 15:1, with a ratio of not higher than about 10:1 being particularly preferred.

Incorporation of the metallocene catalyst component into the carrier can be accomplished in various ways. Incorporation of either or both the aluminoxane and the metallocene component can be into a slurry of catalyst intermediate in a non-polar solvent. The aluminoxane and metallocene component can be added in any order, or together (e.g., as solution in an aromatic or the same non-polar solvent), to that slurry or to the isolated catalyst intermediate. A preferred way of combining aluminoxane and metallocene is to add a solution of these two components in an aromatic solvent (preferably toluene) to a slurry of the catalyst intermediate in a different non-polar solvent. This is preferably done at room temperature, but higher temperatures can also be used as long as the stability of the various materials present is not affected thereby.

Following the addition, the resulting mixture is usually stirred (preferably at room temperature) for sufficient time to allow all of the components to react and/or interact substantially completely with each other. Generally the resulting mixture is stirred for at least about 0.5 hours, preferably at least about 1.0 hours, while stirring times in excess of about 10 hours usually do not offer any particular advantage. Thereafter, the liquid phase can be evaporated from the slurry to isolate a free-flowing powder containing both non-metallocene and metallocene transition metal components. Filtering is usually avoided to substantially eliminate the loss of catalytic components. If evaporation of the liquid phase under atmospheric pressure would require temperatures that might adversely affect the catalyst components (degradation) reduced pressure may be used.

As mentioned above, preferably the catalyst intermediate is first recovered from the slurry in the initially employed non-polar solvent or solvent mixture (e.g., by filtration and/or distilling the solvent) and is then reslurried in the same or a different non-polar solvent. Non-limiting examples of suitable non-polar solvents for the above purpose (i.e., reslurrying of catalyst intermediate) include, but are not limited to, aliphatic, cycloaliphatic and aromatic hydrocarbons such as those set forth above for use in the preparation of the initial slurry of the support material in a non-polar solvent, e.g., n-pentane, isopentane, n-hexane, methylcyclopentane, isohexane, cyclohexane, n-heptane, methylcyclohexane, isoheptane, benzene, toluene, ethylbenzene, xylenes and mixtures of two or more thereof.

The aluminoxanes to be employed according to the present invention are not particularly limited. They include oligomeric linear and/or cyclic alkylaluminoxanes of the general formula R—(Al(R)—O)$_n$—AlR$_2$ for oligomeric, linear aluminoxanes and (—Al(R)—O—)$_m$ for oligomeric cyclic aluminoxanes, wherein n is 1–40, preferably 10–20, m is 3–40, preferably 3–20, and R is a C$_1$–C$_8$ alkyl group, and preferably methyl to provide methylaluminoxane (MAO). MAO is a mixture of oligomers with a very wide distribution of molecular weights and usually with an average molecular weight of about 1200. MAO is typically kept in solution in toluene. It is also possible to use, for the present purpose, aluminoxanes of the type just described wherein the alkyl groups in the above general formulae are different. A preferred example thereof is modified methylaluminoxane (MMAO) wherein in comparison to MAO a part of the methyl groups is replaced by other alkyl groups. Modified methylaluminoxanes are disclosed, e.g., in U.S. Pat. No. 6,001,766.

The aluminoxane or mixture of aluminoxanes is employed in an amount which results in sufficient activation of (at least) the metallocene transition metal catalyst component of the bimetallic catalyst of the present invention. Because the metallocene transition metal catalyst component of the bimetallic catalyst produces the LMW polymer component of the polyethylene resin to be made therewith, under otherwise identical polymerization conditions the weight fraction of LMW polymer component usually increases with increasing amount of aluminoxane employed. Generally, the atomic ratio of Al in the aluminoxane to metal in the metallocene component(s) is at least about 10:1, more preferably at least about 50:1, and most preferred at least about 80:1. On the other hand said ratio is generally not higher than about 1,000:1, particularly not higher than about 500:1, with a ratio of not higher than about 300:1 being particularly preferred.

An alternative way of incorporating the aluminoxane or the activated metallocene catalyst component (metallocene-aluminoxane) onto the support is by stripping the catalyst intermediate of the solvent to form a free-flowing powder. This free-flowing powder can then be impregnated by determining the pore volume of the intermediate material and providing an aluminoxane (or metallocene-aluminoxane) solution in a volume equal to or less than two times the total pore volume of the intermediate material, whereafter the dry bimetallic catalyst is recovered. A more detailed description of said impregnation (incorporation) procedure can be found in, e.g., U.S. Pat. No. 5,614,456, discussed above.

The bimetallic catalyst according to the present invention can be employed as such (i.e., without any activator or cocatalyst) for the production of bimodal polyethylene resins. The reason therefor is that the aluminoxane used in the preparation of the bimetallic catalyst activates not only the metallocene catalyst component but also (at least to some extent) the non-metallocene catalyst component. The purpose of the additional (and optional) cocatalyst is to control the relative activity of said two catalyst components, i.e., the amount of polymer product produced by each of the two catalyst components, and thus the ratio of HMW polymer component to LMW polymer component. Consequently, if the latter ratio as afforded by the instant bimetallic catalyst without cocatalyst is acceptable for the intended purpose, a cocatalyst need not be employed. Generally, however, it is preferred to use the bimetallic catalyst of the present invention in combination with a cocatalyst (that primarily activates the non-metallocene catalyst component) to form a catalyst composition suitable for the production of homo- and copolymers of ethylene with a controlled bimodal molecular weight distribution in a single reactor.

Suitable cocatalysts are organometallic components of Group IA, IB, IIA, IIB, IIIA or IIIB elements, such as, e.g., aluminum, sodium, lithium, zinc, boron and magnesium, and in general any one or a combination of any of the materials commonly employed to activate Ziegler-Natta olefin polymerization catalyst components. Examples thereof are alkyls, hydrides, alkylhydrides and alkylhalides of the mentioned elements, such as n-butyllithium, diethylzinc, di-n-propylzinc and triethylboron. Usually, however, the cocatalyst will be an alkylaluminum component, preferably a compound of the general formula (IV):

$$R^5{}_nAlX_b \qquad (IV)$$

wherein a is 1, 2 or 3, R$^5$ is a linear or branched alkyl group containing 1 to about 10 carbon atoms, X represents hydrogen atom or halogen atom and b is 0, 1 or 2, provided that the sum (a+b) is 3.

Preferred types of compounds of the general formula (IV) above are trialkylaluminum, dialkylaluminum hydride, dialkylaluminum halide, alkylaluminum dihydride and alkylaluminum dihalide. The halide preferably is Cl and/or Br. Preferred alkyl groups are linear or branched and contain 1 to about 6 carbon atoms, such as methyl, ethyl, propyl, isopropyl, butyl, isobutyl, straight-chain and branched pentyl and hexyl groups. Specific examples of suitable cocatalysts are trimethylaluminum, triethylaluminum, tripropylaluminum, triisopropylaluminum, tributylaluminum, triisobutylaluminum, trihexylaluminum, trioctylaluminum, diisobutylhexylaluminum, isobutyldihexylaluminum, diisobutylaluminum hydride, dihexylaluminum hydride, diethylaluminum chloride, and diisobutylaluminum chloride. A preferred cocatalyst is trimethylaluminum (TMA). Other alkylaluminum components, for example those wherein X in the above formula (IV) is alkoxy (e.g., having 1 to 6 carbon atoms) may also be employed.

The amount of cocatalyst is sufficient to (further) activate the non-metallocene transition metal component of the bimetallic catalyst. A suitable amount can be determined by one of ordinary skill in the art. If too little cocatalyst is used, the catalyst may not be completely activated, leading to wasted non-metallocene transition metal component of the catalyst and also failing to provide the target ratio of HMW polymer component to LMW polymer component in the polyethylene resin to be produced (provided the metallocene component of the catalyst precursor is fully activated by the aluminoxane component). Too much cocatalyst, on the other hand, results in wasted cocatalyst, and may even comprise an unacceptable impurity in the polymer produced. Generally, however, the amount of cocatalyst employed is based on the amount of ethylene fed to the polymerization process. The amount of cocatalyst generally is at least about 5 ppm, more preferably at least about 20 ppm, and most preferably at least about 40 ppm. On the other hand, the amount of cocatalyst generally is not higher than about 500 ppm, preferably not higher than about 400 ppm and particularly not higher than about 300 ppm (based on the ethylene employed).

Polymerization

The catalyst or catalyst composition, respectively, of this invention is used to polymerize either ethylene alone or ethylene in conjunction with other olefin-based monomers, such as one or more higher olefins. Examples thereof are $C_3$–$C_{10}$ α-olefins, e.g., propylene, 1-butene, 1-pentene, 1-hexene, 4-methyl-1-pentene, 1-heptene and 1-octene, preferably 1-butene, 1-pentene, 1-hexene or 4-methyl-1-pentene and most preferably 1-hexene. The polymerization may be carried out using any suitable, conventional olefin polymerization process, such as slurry, solution or gas phase polymerization, but preferably it is carried out in a slurry reactor or in a gas phase reactor, particularly a fluidized-bed reactor. The polymerization can be carried out batchwise, semicontinuously or continuously. The reaction is conducted in the substantial absence of catalyst poisons, such as moisture, carbon monoxide and acetylene, with a catalytically effective amount of the catalyst (composition) at temperature and pressure conditions sufficient to initiate the polymerization reaction. Particularly desirable methods for producing the polymers of the present invention are in a slurry or fluidized-bed reactor. Such reactors and means for operating them are described by, e.g., Levine et al., U.S. Pat. No. 4,001,382, Karol et al., U.S. Pat. No. 4,302,566, and Nowlin et al., U.S. Pat. No. 4,481,301. The polymer produced in such reactors contains (deactivated) catalyst particles because the catalyst is not separated from the polymer.

With the catalysts according to the present invention, molecular weight of the polymer may be suitably controlled in a known manner, e.g., by using hydrogen. Hydrogen acts as chain transfer agent. Other reaction conditions being the same, a greater amount of hydrogen results in a lower average molecular weight of the polymer. The molar ratio of hydrogen/ethylene employed will vary depending on the desired average molecular weight of the polymer, and can be determined by a person of ordinary skill in the art for each particular instance. Without limiting the present invention, the amount of hydrogen will generally be between about 0 to about 2.0 moles of hydrogen per mole of ethylene.

Polymerization temperature and time can be determined by one of ordinary skill in the art based on a number of factors, such as the type of polymerization process to be used and the type of polymer to be prepared.

As chemical reactions generally proceed at a greater rate with higher temperature, polymerization temperature should be high enough to obtain an acceptable polymerization rate. In general, therefore, polymerization temperatures are higher than about 30° C., more often higher than about 75° C. On the other hand, polymerization temperature should not be so high as to cause deterioration of, e.g., catalyst or polymer. Specifically, with respect to a fluidized-bed process, the reaction temperature is preferably not so high as to lead to sintering of polymer particles. In general, polymerization temperatures are less than about 300° C., preferably less than about 115° C., more preferably less than about 105° C.

The polymerization temperature used in the process is in part determined by the density of the polyethylene resin to be produced. More particularly, the melting point of the resin depends on resin density. The higher the density of the resin, the higher its melting point. Therefore, lower density resins are produced at lower temperatures to avoid melting or sintering of the polymer particles being produced in the reactor. Thus, without limiting the present invention, polyethylene resins having densities below about 0.92 $g/cm^3$ are polymerized at a temperature preferably above about 60° C., but preferably below about 90° C. Polyethylene resins having densities of about 0.92 to about 0.94 $g/cm^3$ are polymerized at a temperature preferably above about 70° C., but preferably below about 100° C. Polyethylene resins having densities above about 0.94 $g/cm^3$ are polymerized at a temperature preferably above about 80° C., but preferably below 115° C.

When a fluidized-bed reactor is used, a person of ordinary skill in the art is readily able to determine appropriate pressures to use. Fluidized-bed reactors can be operated at pressures of up to about 1000 psi (6.9 MPa) or more, and are generally operated at pressures below about 350 psi (2.4 MPa). Preferably, fluidized-bed reactors are operated at pressures above about 150 psi (1.0 MPa). As is known in the art, operation at higher pressures favors heat transfer because an increase in pressure increases the unit volume heat capacity of the gas.

Once the catalyst is activated, the activated catalyst has a limited lifetime before it becomes deactivated. As is known to those of ordinary skill in the art, the half-life of an activated catalyst depends on a number of factors, such as the species of catalyst (and cocatalyst), the presence of impurities (e.g., water and oxygen) in the reaction vessel, and other factors. An appropriate length of time for carrying out a polymerization can be determined by a person skilled in the art for each particular situation.

The density of ethylene copolymers is in part determined by the amount of comonomer(s) in the polymer molecule. In order to achieve density ranges from about 0.915 to about 0.970 $g/cm^3$ in the copolymers, it is necessary to copolymerize enough α-olefin comonomer with ethylene to achieve a level of about 0.1 to about 25 mole percent of the comonomer(s) in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore the amount of comonomer fed to the reactor will also vary depending on the reactivity of the comonomer.

According to the present invention, it is highly preferred to polymerize ethylene and one α-olefin, particularly 1-hexene, to obtain copolymers having a density of at least about 0.915 g/cm$^3$, more preferably at least about 0.930 g/cm$^3$, but usually not higher than about 0.970 g/cm$^3$, particularly not higher than about 0.960 g/cm$^3$. The flow index (FI) of the copolymers is preferably at least about 1 g/10 min, more preferably at least about 3 g/10 min, but preferably not higher than about 100 g/10 min, and particularly not higher than about 80 g/10 min. The annular die swell at a shear rate of 210 s$^{-1}$ of the copolymers preferably is not lower than about 0.3 g, particularly not lower than about 0.35 g, but preferably not higher than about 0.50 g, particularly not higher than about 0.46 g, whereas their annular die swell at a shear rate of 6300 s$^{-1}$ preferably is not lower than about 0.55 g, particularly not lower than about 0.68 g, but preferably not higher than about 0.95 g, particularly not higher than about 0.88 g. The polyethylene resins of the present invention are especially suitable for the manufacture of blow molded articles, e.g., bottles.

In general, the polyethylene resins of the present invention are preferably extruded or injection or blow molded into articles or extruded or blown into films. For example, films can be produced which are about 0.2 to 5.0 mils (5 to 130 μm, preferably about 0.5 to 2.0 mils (10 to 50 μm) in thickness. Blow molded articles include bottles, containers, fuel tanks and drums. The wall thickness of the blow molded articles will usually be in the range from about 0.5 to about 2,000 mils (10 μm to 50 mm).

The present polymers may be combined with various additives conventionally added to polymer compositions, such as lubricants, fillers, stabilizers, antioxidants, compatibilizers, pigments, etc. Many additives can be used to stabilize the products. For example, additive packages comprising hindered phenol(s), phosphites, antistats and stearates, for addition to resin powders, can be used for pelletization.

EXAMPLES

Methods and Materials

The following Examples further illustrate the essential features of the present invention. However, it will be apparent to those skilled in the art that the specific reactants and reaction conditions used in the Examples do not limit the scope of the present invention.

The properties of the polymers produced in the Examples were determined as follows:

Analysis of the Resin Produced:

Prior to testing, the polymers were processed as described below.

Additives: 1000 ppm each of Irganox™ 1010 (hindered phenol antioxidant) and Irgafos™ 168 (phosphite antioxidant), both produced by C.K. Witco Corp., and 500 ppm of AS900 (antistatic agent manufactured by Ciba-Geigy, Switzerland), were dry blended with the granular resin. The mixture was then melt mixed using either a Brabender twin screw compounder (¾" (19 mm) screw diameter) at melt temperatures of less than 200° C., with a nitrogen purge to the feed throat, or a 40 g Brabender batch mixer.

Flow Index: The Flow Index (FI, g/10 min, at 190° C. was determined as specified in ASTM D 1238 using a load of 21.6 kg.

Density: The density (g/cm$^3$) was determined as specified in ASTM D 1505-68 with the exception that the density measurement was taken 4 hours instead of 24 hours after the sample was placed in the density column.

Die Swell: Die swell was measured by a technique outlined in the Proceedings of the SPE 48th Annual Technical Conference, 1990, pp. 1612–1616. This test determines the weight of an annular extrudate under controlled extrusion conditions. The test is conducted at a range of shear rates, generally 210 s$^{-1}$ to 6300 s$^{-1}$, these shear rates being typical of those used in commercial blow moldings operations. The weight of the extrudate relates to the bottle wall thickness, and bottle weight. Annular die swell measurements have an excellent correlation to bottle weight.

Analytical procedure for resolving components in bimodal polyethylene resins:

Studies of bimetallic catalysts used for the synthesis of bimodal polyethylene resins utilized Gel Permeation Chromatography (GPC) to determine polymer molecular weight distribution (MWD). The molecular weight characterization given in the following Examples was carried out on a Waters 150C gel permeation chromatograph. The chromatograms were run at 140° C. using 1,3,5-trichlorobenzene as the solvent. The Waters 150C determines MWD using the technique of size exclusion. The molecular weight data were used to determine the number average molecular weight ($M_n$) and the weight average molecular weight ($M_w$), and for deconvolution of the bimodal MWD resins into the separate low molecular weight (LMW) and high molecular weight (HMW) polymer components.

In a typical GPC curve of the bimodal PE resin, the contributions from each molecular weight polymer component overlap significantly. This results in a broad GPC chromatogram with relatively poor resolution of each of the two polymer components, i.e., the relatively high molecular weight component and the relatively low molecular weight component.

To overcome this problem, resin samples were produced using single component catalysts in which the catalyst formulation was chosen to attempt to match either the Zr catalyst component (producing the LMW polymer component) or the Ti catalyst component (producing the HMW polymer component) in the bimetallic Ti/Zr catalyst. Each GPC curve was resolved into Flory peaks according to the earlier described procedure (V. V. Vickroy, H. Schneider and R. F. Abbott, J., *Appl. Polym. Sci.*, 50, 551 (1993); Y. V. Kissin, *J. Poly. Sci. Part A, Polym. Chem.*, 33, 227 (1995); Y. V. Kissin, *Makromol. Chem., Macromol. Symp.*, 66, 83 (1993)). One Flory peak represents the polymer produced by only one type of active site in the catalyst. Hence, resolution of the polymer sample into individual Flory components ascertains the number of individual active sites in the catalyst that provided the polymer sample.

For example, the LMW polyethylene produced by only the Zr catalyst component is represented by three Flory peaks. (one low molecular weight peak present in very small quantity and two somewhat higher molecular weight peaks in similar quantities). The HMW polymer component (produced by only the Ti catalyst component) can be described as an overlap of either four or five Flory peaks. Four Flory peaks are required to model the polyethylene produced by a Ti-based catalyst component wherein the intermediate has been treated with 1-butanol, while five Flory peaks are required to model the polyethylene produced by Ti-based catalyst components prepared with the aldehyde/ketone treated intermediate.

To avoid uncertainties caused by the significant overlap of the highest molecular weight Flory peak of the polyethylene produced by the Zr-only catalyst component and the two relatively lower molecular weight Flory peaks of the HMW polymer components, a computer analysis procedure was developed. This procedure uses the relationship between respective peak positions in the single-catalyst component polymer samples and other Flory peaks that do not overlap in the GPC curves of the same resins. This procedure affords a reliable estimation of the amount of polymer produced from each of the two catalyst components. It also allows calculation of the average molecular weights of the LMW and the HMW polymer components as well as their molecular weight distributions.

Catalyst Preparation Example 1

Under a dry nitrogen atmosphere, a Schlenk flask was charged with silica (Davison 955, 6.00 g), previously calcined at 600° C. for 4 hours, and isohexane (about 100 mL). The flask was placed into an oil bath (about 55° C.). Dibutylmagnesium (4.32 mmol) was added to the stirred silica slurry at about 55° C. and stirring was continued for about 1 hour. Then, benzaldehyde (4.32 mmol, molar ratio magnesium compound:carbonyl-containing component= 1:1) was added to the flask at about 55° C. and the mixture was stirred for about 1 hour. Finally, $TiCl_4$ (2.592 mmol, atomic ratio Mg:Ti=1.67:1) was added at about 55° C. and stirring was continued for about 1 hour. The liquid phase was removed by evaporation under nitrogen flow at about 55° C. to yield a free-flowing powder. A portion of this powder (2.00 g) was then re-slurried in isohexane (about 50 mL) at ambient temperature. Then, a solution prepared by combining bis(n-butylcyclopentadienyl)zirconium dichloride ((n-BuCp)$_2$ZrCl$_2$, 0.1 mmol, 0.0404 g, atomic ratio Ti:Zr=7.4:1) with MAO (methylaluminoxane) (1220 mmol Al, atomic ratio Al:Zr=120:1) in toluene was added to the slurry. After stirring the resulting mixture at ambient temperature for about 0.5 hours, the liquid phase was removed by evaporation under a dry nitrogen flow at about 55° C. to yield a free-flowing powder. In this catalyst powder, the Zr catalyst component is completely activated by the MAO and is capable of producing polyethylene without the addition of any other cocatalyst. In addition, the MAO also activates the Ti catalyst component relatively well so that the Ti catalyst component can also produce polyethylene. The use of an additional cocatalyst together with this catalyst, therefore, only serves to control the relative reactivities of these two catalyst components (and, thus, the relative ratio of HMW polymer component and LMW polymer component produced by the bimetallic catalyst).

Catalyst Preparation Example 2

Catalyst Preparation Example 1 was repeated, except that salicylaldehyde (4.32 mmol) was used in place of benzaldehyde.

Catalyst Preparation Example 3

Catalyst Preparation Example 1 was repeated, except that butyraldehyde (4.32 mmol) was used in place of benzaldehyde.

Catalyst Preparation Example 4

Catalyst Preparation Example 1 was repeated, except that 2-pentanone (4.32 mmol) was used in place of benzaldehyde.

Catalyst Preparation Example 5

Catalyst Preparation Example 1 was repeated, except that 3'-methylacetophenone (4.32 mmol) was used in place of benzaldehyde.

Catalyst Preparation Example 6

Under a dry nitrogen atmosphere, a Schlenk flask was charged with silica (Davison 955, 6.00 g), previously calcined for 4 hours at 600° C., and isohexane (about 100 mL). The flask was placed in an oil bath (about 55° C.). Dibutylmagnesium (4.32 mmol) was added to the stirred silica slurry at about 55° C. and stirring was continued for about 1 hour. Then, benzaldehyde (4.32 mmol) was added to the flask at about 55° C. and the mixture was stirred for about 1 hour. Finally, $TiCl_4$ (2.592 mmol) was added to the flask at about 55° C. and stirring was continued for about 1 hour. The liquid phase was removed by evaporation under dry nitrogen flow at about 55° C. to yield a free-flowing powder. A portion of this powder (2.00 g) was then re-slurried in isohexane (about 50 mL) at ambient temperature. Then, a solution prepared by combining bis(cyclopentadienyl)zirconium dichloride (Cp$_2$ZrCl$_2$, 0.14 mmol, 0.0409 g) with MAO (14.00 mmol Al) in toluene was added to the slurry. After stirring the resulting mixture at ambient temperature for about 0.5 hours, the liquid phase was removed by evaporation under a dry nitrogen flow at about 55° C. to yield a free-flowing powder.

Catalyst Preparation Example 7

Catalyst Preparation Example 6 was repeated, except that the MAO and Cp$_2$ZrCl$_2$ loadings were decreased to 12.00 mmol Al and 0.12 mmol (0.0351 g), respectively.

Catalyst Preparation Example 8

Catalyst Preparation Example 6 was repeated, except that the TiCi$_4$ loading was increased from 2.592 mmol to 3.06 mmol.

Catalyst Preparation Example 9

Catalyst Preparation Example 7 was repeated, except that the $TiCl_4$ loading was increased from 2.592 mmol to 3.06 mmol.

Catalyst Preparation Example 10

Catalyst Preparation Example 7 was repeated, except that the $TiCl_4$ loading was increased from 2.592 mmol to 3.66 mmol.

Catalyst Preparation Example 11

Catalyst Preparation Example 6 was repeated, except that 3'-methylacetophenone (4.32 mmol) was used in place of benzaldehyde.

Catalyst Preparation Example 12

Catalyst Preparation Example 6 was repeated, except that p-tolualdehyde (4.32 mmol) was used in place of benzaldehyde.

Catalyst Preparation Example 13

Catalyst Preparation Example 12 was repeated, except that the TiCi$_4$ loading was increased from 2.592 mmol to 3.66 mmol.

Polymerization Examples 1–13

Ethylene/1-hexene copolymers were prepared in a slurry polymerization process with the bimetallic catalysts prepared according to Catalyst Preparation Examples 1–13 in the presence of trimethylaluminum (TMA) cocatalyst.

A 1.6 liter stainless-steel autoclave equipped with a magnet-drive impeller stirrer was filled with heptane (750 mL) and 1-hexene (30 mL) under a slow nitrogen purge at 50° C. and then TMA (2.0 mmol) was added. The reactor vent was closed, the stirring speed was increased to 1000 rpm, and the temperature was increased to 95° C. The internal pressure was increased by 6.0 psi (41 kpa)with hydrogen and then ethylene was introduced to maintain the total pressure at 200–210 psig (1.4–1.5 MPa). After that, the temperature was decreased to 85° C., 20.0–40.0 mg of the catalyst was introduced into the reactor with ethylene overpressure, and the temperature was increased and held at 95° C. The polymerization reaction was carried out for 1 hr and then the ethylene supply was stopped. The reactor was cooled to ambient temperature and the polyethylene was collected. The polymerization results are given in Table 1.

TABLE 1

| Catalyst Prep. Example | Modifier | Ti Loading (mmol)* | Al Loading (mmol)** | Productivity (g/g · hr) | Flow Index (g/10 min) |
|---|---|---|---|---|---|
| 1 | Benzaldehyde | 2.592 | 12.00 | 2390 | 52.6 |
| 2 | Salicylaldehyde | 2.592 | 12.00 | 880 | 4.5 |
| 3 | Butyraldehyde | 2.592 | 12.00 | 1160 | 55.1 |
| 4 | 2-Pentanone | 2.592 | 12.00 | 1650 | 4.7 |
| 5 | 3'-Methyl-acetophenone | 2.592 | 12.00 | 1840 | 130 |
| 6 | Benzaldehyde | 2.592 | 14.00 | 1600 | 35.5 |
| 7 | Benzaldehyde | 2.592 | 12.00 | 1350 | 21.1 |
| 8 | Benzaldehyde | 3.06 | 14.00 | 1560 | 17.6 |
| 9 | Benzaldehyde | 3.06 | 12.00 | 1490 | 12.9 |
| 10 | Benzaldehyde | 3.66 | 12.00 | 2420 | 5.4 |
| 11 | 3'-Methyl-acetophenone | 2.592 | 12.00 | 1210 | 6.0 |
| 12 | p-Tolualdehyde | 2.592 | 14.00 | 1640 | 44.9 |
| 13 | p-Tolualdehyde | 3.66 | 14.00 | 2660 | 4.7 |

*mmol/6.00 g silica
**mmol/2.00 g Ti intermediate

The FI value given in Table 1 is directly proportional to the amount of LMW polymer component produced by the Zr catalyst component. Low FI values indicate that the polymer produced with the bimetallic catalyst has a relatively small amount of LMW polymer component.

Figure 2:
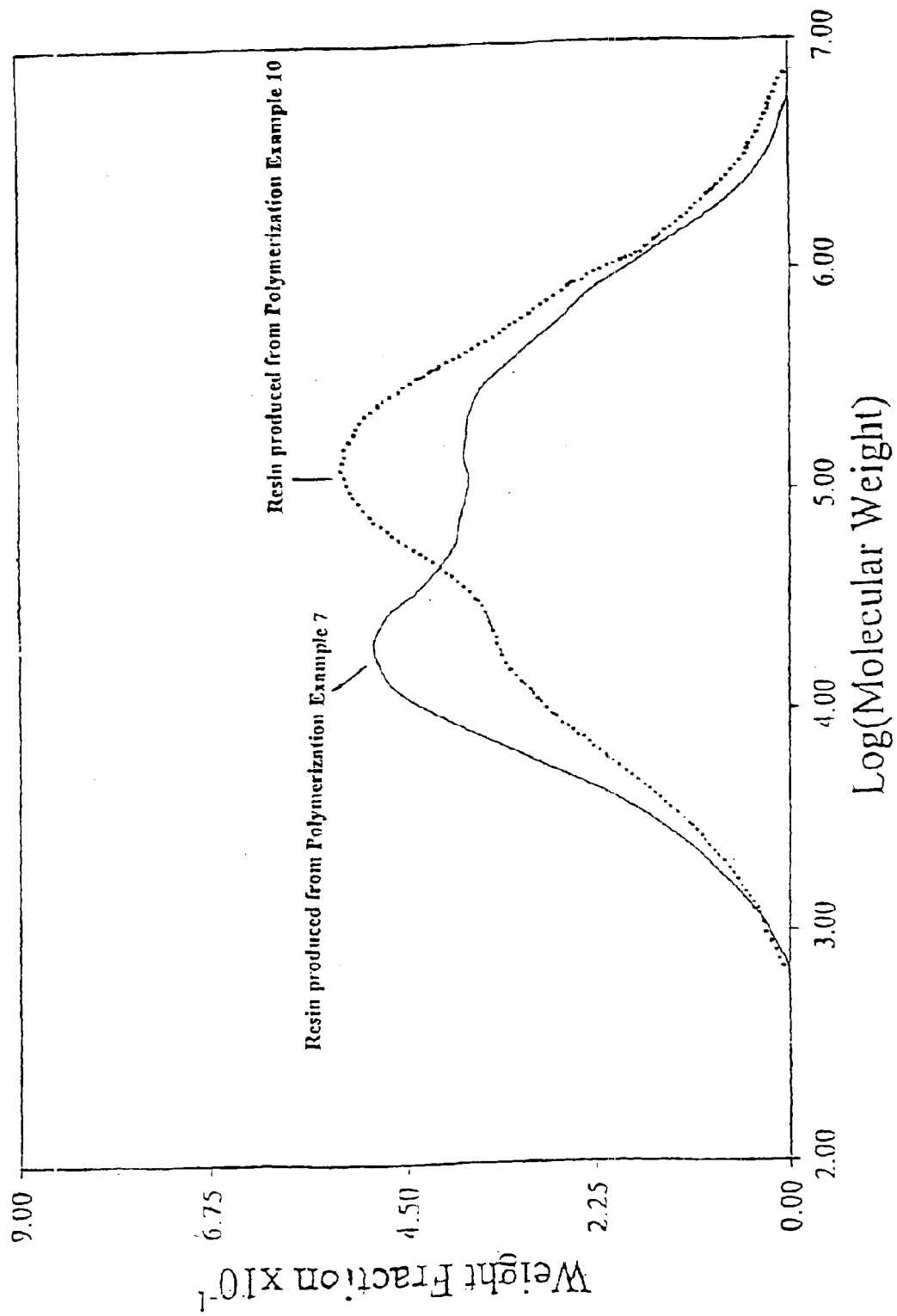
FIG. 2 shows a GPC curve of the resins produced in Polymerization Examples 7 and 10.

As can be seen from the results in Table 1, the relative fraction of low and high molecular weight components in the bimodal resins produced by the Ti/Zr bimetallic catalysts according to the present invention depends upon the modifier type (identity of aldehyde/ketone), Ti loading and Al loading used in the preparation of the catalyst. For a given modifier and Ti loading, increasing the Al loading in the preparation of the catalyst results in resins with a higher weight fraction of the low molecular weight component (produced by the Zr active centers), as evident from the GPC curve (FIG. 1), and a higher flow index of the resin. In contrast, for a given modifier and Al loading, increasing the Ti loading in the preparation of the catalyst results in resins with a higher weight fraction of the high molecular weight component (produced by the Ti active centers), as evident from the GPC curve (FIG. 2), and a lower flow index of the resin. Moreover, the MWD of the HMW polymer component and the molecular weight of the LMW polymer component can be varied by changing the catalyst preparation modifier (carbonyl-containing component).

Comparative Catalyst Preparation Example 1

The catalyst was prepared in a two-step process:

STEP 1: Under an inert atmosphere of dry nitrogen, silica (Davison 955, 367 g), previously calcined for 4 hours at 600° C. under dry nitrogen, and isohexane (3600 mL) were added to a 2 gallon (7.6 L) glass vessel containing a stirring paddle. The stirring rate was set to 100 rpm, and the temperature of the silica/isohexane slurry was raised to 51–54° C. for the following reagent addition and drying steps. Next, dibutylmagnesium (0.264 mol, 265.3 g of a 2.42 wt % Mg solution in heptane) was added to the stirred silica slurry. After stirring at 51–54° C. for 2 hours, 1-butanol (0.251 mol, 18.6 g) was added to the stirred reaction mixture. After stirring for another two hours, titanium tetrachloride (0.160 mol, 30.3 g) was added to the stirred reaction mixture, and stirring was continued for 2 hours. The liquid phase was then removed by evaporation under nitrogen purge, to yield a free-flowing powder.

STEP 2: Under an inert atmosphere of dry nitrogen and at ambient temperature, 374 g of the titanium-containing catalyst component described in Step 1 above, and isopentane (1870 mL) were added to a 2 gallon (7.6 L) glass vessel containing a stirring paddle. The stirring rate was set to 110 rpm. A solution was prepared by mixing (n-BuCp)$_2$ZrCl$_2$ (bis(n-butylcyclopentadienyl)zirconium dichloride) (21.2 mmol, 8.564 g) and MAO (2.546 mol, 512.7 g of a 13.4 wt % Al solution in toluene) in a stainless-steel Hoke bomb at ambient temperature, under an inert atmosphere of dry nitrogen. This solution was then slowly added to the stirred titanium catalyst component/isopentane slurry at ambient temperature, over a period of 50 minutes. The temperature of the reaction mixture was raised to 47° C., and the liquid phase was removed by evaporation under nitrogen purge to yield a free-flowing brown powder.

Comparative Catalyst Preparation Example 2

The catalyst is prepared in a two-step process:

STEP 1: Under an inert atmosphere of dry nitrogen, silica (Davison 955, 432 g), previously calcined for 4 hours at 600° C. under dry nitrogen, and isohexane (2160 mL) were added to a 2 gallon (7.6 L) glass vessel containing a stirring paddle. The stirring rate was set to 100 rpm, and the temperature of the silica/isohexane slurry was raised to 45–51° C. for the following reagent addition and drying steps. Next, dibutylmagnesium (0.309 mol, 205 g of a 3.67 wt % Mg solution in heptane) was added to the stirred silica slurry. After stirring at about 50° C. for 1 hour, 1-butanol (0.297 mol, 22 g) was added to the stirred reaction mixture. After stirring for another hour, titanium tetrachloride (0.113 mol, 21.4 g) was added to the stirred reaction mixture, and stirring was continued for 1 hour. The liquid phase was then removed by evaporation under nitrogen purge, to yield a free-flowing beige powder.

STEP 2: Under an inert atmosphere of dry nitrogen and at ambient temperature, 330 g of the titanium-containing catalyst component described in Step 1 above, and isohexane (1650 mL) were added to a 2 gallon (7.6 L) glass vessel containing a stirring paddle. The stirring rate was set to 120 rpm. A solution was prepared by mixing Cp$_2$ZrCl$_2$ (zirconocene dichloride) (26.5 mmol, 7.74 g) and MAO (2.64 mol Al, 532 g of a 13.4 wt % Al solution in toluene) in a stainless-steel Hoke bomb at ambient temperature, under an inert atmosphere of dry nitrogen. This solution was then added to the stirred titanium catalyst component/isohexane slurry at ambient temperature, over a period of 30 minutes. The temperature of the reaction mixture was raised to 48–50° C., and the liquid phase was removed by evaporation under nitrogen purge to yield a free-flowing brown powder.

Catalyst Preparation Example 14

The catalyst was prepared in a two-step process:

STEP 1: Under an inert atmosphere of dry nitrogen, silica (Davison 955, 6.00 g), previously calcined for 4 hours at 600° C. under dry nitrogen, and isohexane (100 mL) were added to a Schlenk flask containing a magnetic stirring bar. The flask was placed in a 55° C. oil bath, and the slurry was stirred vigorously. Next, dibutylmagnesium (4.32 mmol, 5.45 mL of a 0.792 M solution in heptane) was added via syringe to the stirred silica slurry at 55° C. After stirring at 55° C. for 1.5 hours, benzaldehyde (4.32 mmol, 0.44 mL) was added via syringe to the stirred reaction mixture. After stirring at 55° C. for another 1.5 hours, titanium tetrachloride (3.06 mmol, 3.42 mL of a 0.894 M solution in heptane) was added via syringe to the stirred reaction mixture, and stirring was continued for 1 hour at 55° C. The liquid phase was then removed by evaporation under nitrogen purge at 55° C., to yield a free-flowing pale yellow powder.

STEP 2: Under an inert atmosphere of dry nitrogen, 2.0 g of the titanium-containing catalyst component described in Step 1 above, and isohexane (50 mL) were added to a Schlenk flask containing a magnetic stirring bar. A solution was prepared by mixing $Cp_2ZrCl_2$ (0.33 mmol, 0.097 g) and MAO (33.2 mmol Al, 7.0 mL of a 4.74 M solution in toluene) in a serum bottle at ambient temperature, under an inert atmosphere of dry nitrogen. Then 2.5 mL of this solution were added dropwise to the stirred titanium catalyst component/isohexane slurry at ambient temperature. After stirring for another 75 minutes at ambient temperature, the flask was placed in an oil bath and the liquid phase was removed by evaporation under nitrogen purge at 57–59° C., to yield a free-flowing brown powder.

Catalyst Preparation Example 15

The catalyst was prepared in a two-step process:

STEP 1: Under an inert atmosphere of dry nitrogen, silica (Crosfield ES70, 240 g), previously calcined for 4 hours at 600° C. under dry nitrogen, and isohexane (1440 mL) were added to a 3 liter round-bottom flask fitted with a paddle stirrer. The flask was placed in a 54° C. oil bath, and the slurry was stirred vigorously. Next, dibutylmagnesium (0.173 mol, 164 mL of a 1.05 M solution in heptane) was added dropwise to the stirred silica slurry at 54° C. over 45 minutes. After stirring at 54° C. for another 45 minutes, benzaldehyde (0.173 mmol, 18.3 g, diluted with 70 mL isohexane) was added dropwise to the stirred reaction mixture over 10 minutes. After stirring at 54° C. for another 45 minutes, titanium tetrachloride (0.123 mol, 23.4 g, diluted with 70 mL isohexane) was added dropwise to the stirred reaction mixture, and stirring was continued for 45 minutes at 55° C. The liquid phase was then removed by evaporation under nitrogen purge at 54° C., to yield a free-flowing yellow powder.

STEP 2: Under an inert atmosphere of dry nitrogen, 272 g of the titanium-containing catalyst component described in Step 1 above, and isohexane (1360 mL) were added to a 3 liter round-bottom flask fitted with a paddle stirrer. The flask was placed in a 54° C. oil bath, and the slurry was stirred vigorously. A solution was prepared by rnixing $Cp_2ZrCl_2$ (15.9 mmol, 4.64 g) and MAO (1.90 mol Al, 383 g of a 13.4 wt % Al solution in toluene) in a Schlenk flask at ambient temperature, under an inert atmosphere of dry nitrogen. This solution was then added dropwise to the stirred titanium catalyst component/isohexane slurry, which was kept at 54° C., over a period of 45 minutes. After stirring for a further 20 minutes at 54° C., the liquid phase was removed by evaporation under nitrogen purge at 54° C., to yield a free-flowing brown powder.

Catalyst Preparation Example 16

The catalyst was prepared in a two-step process:

STEP 1: Under an inert atmosphere of dry nitrogen, silica (Crosfield ES70, 130 g), previously calcined for 4 hours at 600° C. under dry nitrogen, and isohexane (780 mL) were added to a 2 liter round-bottom flask fitted with a paddle stirrer. The flask was placed in a 54° C. oil bath, and the slurry was stirred vigorously. Next, dibutylmagnesium (0.0936 mol, 89.1 mL of a 1.05 M solution in heptane) was added dropwise to the stirred silica slurry at 54° C. over 20 minutes. After stirring at 54° C. for another 50 minutes, benzaldehyde (0.0936 mol, 9.93 g, diluted with 40 mL isohexane) was added dropwise to the stirred reaction mixture over 10 minutes. After stirring at 54° C. for another 50 minutes, titanium tetrachloride (0.0663 mol, 12.6 g, diluted with 40 mL isohexane) was added dropwise to the stirred reaction mixture over 10 minutes, and stirring was continued for 50 minutes at 54° C. The liquid phase was then removed by evaporation under nitrogen purge at 54° C., to yield a free-flowing yellow powder.

STEP 2: Under an inert atmosphere of dry nitrogen, 139 g of the titanium-containing catalyst component described in Step 1 above, and isohexane (700 mL) were added to a 3 liter round-bottom flask fitted with a paddle stirrer. The flask was placed in a 54° C. oil bath, and the slurry was stirred vigorously. A solution was prepared by mixing $Cp_2ZrCl_2$ (8.11 mmol, 2.37 g) and MAO (0.97 mol Al, 196 g of a 13.4 wt % Al solution in toluene) in a Schlenk flask at ambient temperature, under an inert atmosphere of dry nitrogen. This solution was then added dropwise to the stirred titanium catalyst component/isohexane slurry, which was kept at 54° C., over a period of 130 ninutes. The liquid phase was removed by evaporation under nitrogen purge at 54° C., to yield a free-flowing brown powder.

Catalyst Preparation Example 17

The catalyst was prepared in a two-step process:

STEP 1: Under an inert atmosphere of dry nitrogen, silica (Davison 955, 6.00 g), previously calcined for 4 hours at 600° C. under dry nitrogen, and isohexane (100 mL) were added to a Schlenk flask containing a magnetic stirring bar. The flask was placed in a 55° C. oil bath, and the slurry was stirred vigorously. Next, dibutylmagnesium (4.32 mmol, 5.45 mL of a 0.792 M solution in heptane) was added via syringe to the stirred silica slurry at 55° C. After stirring at 55° C. for 1.5 hours, benzaldehyde (4.32 mmol, 0.44 mL) was added via syringe to the stirred reaction mixture. After stirring at 55° C. for another 1.5 hours, titanium tetrachloride (3.06 mmol, 3.42 mL of a 0.894 M solution in heptane) was added via syringe to the stirred reaction mixture, and stirring was continued for 1 hour at 55° C. The liquid phase was then removed by evaporation under nitrogen purge at 55° C., to yield a free-flowing pale yellow powder.

STEP 2: Under an inert atmosphere of dry nitrogen, 1.50 g of the titanium-containing catalyst component described in Step 1 above, and isohexane (13 mL) were added to a Schlenk flask containing a magnetic stirring bar. A solution was prepared by mixing $Cp_2ZrCl_2$ (0.26 mmol, 0.077 g) and MAO (31.5 mmol Al, 6.9 mL of a 4.56 M solution in toluene) in a serum bottle at ambient temperature, under an inert atmosphere of dry nitrogen. Then, 2.3 mL of this solution were added dropwise to the stirred titanium catalyst component/isohexane slurry at ambient temperature over a period of 2 minutes. After stirring for a further 15 minutes at ambient temperature, the flask was placed in an oil bath and the liquid phase was removed by evaporation under nitrogen purge at 50° C., to yield a free-flowing brown powder.

Catalyst Preparation Example 18

The catalyst was prepared in a two-step process:

STEP 1: Under an inert atmosphere of dry nitrogen, silica (Davison 955, 6.00 g), previously calcined for 4 hours at 600° C. under dry nitrogen, and isohexane (100 mL) were added to a Schlenk flask containing a magnetic stirring bar. The flask was placed in a 55° C. oil bath, and the slurry was stirred vigorously. Next, dibutylmagnesium (4.32 mmol, 5.45 mL of a 0.792 M solution in heptane) was added via syringe to the stirred silica slurry at 55° C. After stirring at 55° C. for 1.5 hours, benzaldehyde (4.32 mmol, 0.44 mL) was added via syringe to the stirred reaction mixture. After stirring at 55° C. for another 1.5 hours, titanium tetrachloride (3.06 mmol, 3.42 mL of a 0.894 M solution in heptane) was added via syringe to the stirred reaction mixture, and stirring was continued for 1 hour at 55° C. The liquid phase was then removed by evaporation under nitrogen purge at 55° C., to yield a free-flowing pale yellow powder.

STEP 2: Under an inert atmosphere of dry nitrogen, 2.0 g of the titanium-containing catalyst component described in Step 1 above, and isohexane (50 mL) were added to a Schlenk flask containing a magnetic stirring bar. A solution was prepared by mixing $Cp_2ZrCl_2$ (0.33 mmol, 0.097 g) and MAO (33.2 mmol Al, 7.0 mL of a 4.74 M solution in toluene) in a serum bottle at ambient temperature, under an inert atmosphere of dry nitrogen. Then, 2.95 mL of this solution were added dropwise to the stirred titanium component/isohexane slurry at ambient temperature. After stirring for an additional 70 minutes at ambient temperature, the flask was placed in an oil bath and the liquid phase was removed by evaporation under nitrogen purge at 57–60° C., to yield a free-flowing brown powder.

Comparative Polymerization Example 1

An ethylene/1-hexene copolymer was prepared with the catalyst prepared as described in Comparative Catalyst Preparation Example 1. The polymerization was conducted in a gas phase reactor operated in a continuous mode which is run at 100.0° C., 356 psig (2.45 MPa) total reactor pressure, and with the following partial pressures: 162 psi (1.12 MPa) ethylene, 28.0 psi (193 kPa) isopentane, 0.81 psi (5.6 kPa) 1-hexene and 2.4 psi (17 kPa) hydrogen. The molar gas ratios were 0.0050 1-hexene/ethylene and 0.0149 hydrogen/ethylene with a residence time of 2.67 hours. The cocatalyst trimethylaluminum (TMA) level was 128 ppm by weight based on the ethylene feed to the reactor and the water addback level was 34 ppm by volume. The ppm values were based on ethylene feed. A total of 140 pounds (64 kg) was collected for sampling.

Comparative Polymerization Example 2

An ethylene/1-hexene copolymer was produced with the catalyst prepared as described in Comparative Catalyst Preparation Example 2. The polymerization was conducted in a gas phase continuous reactor which was run at 100.0° C., 341 psig (2.35 MPa) total reactor pressure, and with the following partial pressures: 197 psi (1.36 MPa) ethylene, 16.2 psi (112 kPa) isopentane, 1.60 psi (11.0 kPa) 1-hexene and 3.1 psi (21 kPa) hydrogen. The molar gas ratios were 0.0081 1-hexene/ethylene and 0.0158 hydrogen/ethylene with a residence time of 4.36 hours. The cocatalyst trimethylaluminum (TMA) level was 24.5 ppm by weight, modified methylmethylacetophenone (MMAO) was 137 ppm by weight, and no water addback was used. The ppm values are based on ethylene feed. A total of 241 pounds (109 kg) of polyethylene was produced for product evaluation.

Polymerization Example 14

A 3.8 liter stainless steel autoclave operated in the batch mode, equipped with a paddle stirrer, under a slow nitrogen purge at 50° C., and with stirring set to 300 rpm, was charged with 1500 mL of dry heptane, 40 µL of water (see explanation of the function of water at the end of this Example), 4.2 mmol (3.0 mL of a 1.4 M solution in heptane) of trimethylaluminum (TMA), and 60 mL of 1-hexene. The reactor vent was closed and the stirring speed set to 900 rpm, and the internal temperature was raised to 95° C., whereafter the internal pressure was raised from 11 psi (76 kPa) to 17 psi (117 kPa) by addition of 6 psi (41 kPa) of hydrogen. Ethylene was then introduced into the reactor and the internal pressure was increased to 224 psi (1.54 MPa). Finally, 0.0437 g of the catalyst prepared as described in Catalyst Preparation Example 14 was added to the autoclave. The reactor pressure was maintained at 219–224 psi (1.51–1.54 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 66.7 g of polyethylene resin (ethylene/1-hexene copolymer).

It is noted that the addition of very small amounts of water to a polymerization reactor containing TMA (or any other alkylaluminum component) significantly increases the activity of the metallocene catalyst component relative to the non-metallocene catalyst component. This water addition process is commonly referred to as "water addback." Hence, water addback is a method of controlling the weight fractions of the HMW and LMW polymer components. This is an extremely important technique in a commercial reactor to produce the target polyethylene. For example, if the product must contain 60% by weight HMW polymer component and 40% by weight LMW polymer component, water addback is normally used to meet this product composition requirement. U.S. Pat. No. 5,525,678 to Mink et al. discloses this water addback technique for controlling polymer weight fractions with a bimetallic catalyst.

Polymerization Example 15

A 3.8 liter stainless steel autoclave, equipped with a paddle stirrer, under a slow nitrogen purge at 50° C., and with stirring set to 300 rpm, was charged with 1500 mL of dry heptane, 40 µL of water, 4.2 mmol (3.0 mL of a 1.4 M solution in heptane) of trimethylaluminum (TMA), and 60 mL of 1-hexene. The reactor vent was closed and the stirring speed set to 900 rpm, and the internal temperature was raised to 95 2C, whereafter the internal pressure was raised from 10 psi (69 kPa) to 16 psi (110 kPa) by addition of hydrogen. Ethylene was introduced into the reactor and the internal pressure was increased to 227 psi (1.57 MPa). Finally, 0.0482 g of the catalyst prepared as described in Catalyst Preparation Example 15 was added to the autoclave. The reactor pressure was maintained at 220–225 psi (1.52–1.55 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 88.8 g of polyethylene resin (ethylene/1-hexene copolymer).

Polymerization Example 16

A 3.8 liter stainless steel autoclave, equipped with a paddle stirrer, under a slow nitrogen purge at 50° C., and with stirring set to 300 rpm, was charged with 1500 mL of dry heptane, 40 µL of water, 4.2 mmol (3.0 mL of a 1.4 M solution in heptane) of trimethylaluminum (TMA), and 60 mL of 1-hexene. The reactor vent was closed and the stirring speed set to 900 rpm, and the internal temperature was raised to 95° C., whereafter the internal pressure was raised from 10 psi (69 kPa) to 16 psi (110 kPa) by addition of hydrogen. Ethylene was introduced into the reactor and the internal pressure was increased to 223 psi (1.56 MPa). Finally, 0.0507 g of the catalyst prepared as described in Catalyst Preparation Example 16 was added to the autoclave. The reactor pressure was maintained at 220–225 psi (1.52–1.55 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 73.2 g of polyethylene resin (ethylene/1-hexene copolymer). This procedure was repeated using identical reaction conditions, except that 0.0465 g of catalyst described in Catalyst Preparation Example 16 was added to the autoclave, and 85.4 g of polyethylene resin (ethylene/1-hexene copolymer) product was obtained. The granular resin products of these two slurry polymerization experiments were blended together, and the combined granular resin was then stabilized with an additive package and melt homogenized before the Flow Index and the Annular Die Swell were determined.

Polymerization Example 17

A 3.8 liter stainless steel autoclave, equipped with a paddle stirrer, under a slow nitrogen purge at 50° C., and with stirring set to 300 rpm, was charged with 1500 mL of dry heptane, 40 µL of water, 4.2 mmol (3.0 mL of a 1.4 M solution in heptane) of trimethylaluminum (TMA), and 60 mL of 1-hexene. The reactor vent was closed and the stirring speed set to 900 rpm, and the internal temperature was raised to 95° C., whereafter the internal pressure was raised from 10 psi (69 kPa) to 16 psi (110 kPa) by addition of hydrogen. Ethylene was introduced into the reactor and the internal pressure was increased to 225 psi (1.55 MPa). Finally, 0.0579 g of the catalyst prepared as described in Catalyst Preparation Example 17 was added to the autoclave. The reactor pressure was maintained at 220–225 psi (1.52–1.55 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 135.2 g of polyethylene resin (ethylene/1-hexene copolymer).

Polymerization Example 18

A 3.8 liter stainless steel autoclave, equipped with a paddle stirrer, under a slow nitrogen purge at 50° C., and with stirring set to 300 rpm, was charged with 1500 mL of dry heptane, 40 µL of water, 4.2 mmol (3.0 mL of a 1.4 M solution in heptane) of trimethylaluminum (TMA), and 60 mL of 1-hexene. The reactor vent was closed and the stirring speed set to 900 rpm, and the internal temperature was raised to 95° C., whereafter the internal pressure was raised from 11 psi (76 kPa) to 17 psi (117 kPa) by addition of hydrogen. Ethylene was introduced into the reactor and the internal pressure was increased to 235 psi (1.62 MPa). Finally, 0.0560 g of the catalyst prepared as described in Catalyst Preparation Example 18 was added to the autoclave. The reactor pressure was maintained at 225–235 psi (1.55–1.62 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 128.2 g of polyethylene resin (ethylene/1-hexene copolymer).

Polymerization Example 19

A 3.8 liter stainless steel autoclave, equipped with a paddle stirrer, under a slow nitrogen purge at 50° C., and with stirring set to 300 rpm, was charged with 1500 mL of dry heptane, 40 µL of water, 4.2 mmol (3.0 mL of a 1.4 M solution in heptane) of trimethylaluminum (TMA), and 60 mL of 1-hexene. The reactor vent was closed and the stirring speed set to 900 rpm, and the internal temperature was raised to 95° C., whereafter the internal pressure was raised from 10 psi (69 kPa) to 16 psi (110 kPa) by addition of hydrogen. Ethylene was then introduced into the reactor and the internal pressure was increased to 224 psi (1.54 MPa). Finally, 0.0589 g of the catalyst prepared as described in Catalyst Preparation Example 17 was added to the autoclave. The reactor pressure was maintained at 219–224 psi (1.51–1.54 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield 135.6 g of polyethylene resin (ethylene/1-hexene copolymer).

Table 2 summarizes some of the properties of the resins prepared according to the above Comparative Polymerization Examples 1 and 2 and Polymerization Examples 14–19. In addition, properties of some commercially available resins (Samples A to G) are also shown.

TABLE 2

| Resin (Polym. Ex. No.) | Catalyst Prep. Example No. | Ti Catalyst Comp. Modifier | Reactor Type | Catalyst Type | Polymer FI (g/10 min) | Polymer Density (g/cm$^3$) | ADS @ 210 s$^{-1}$ (g) | ADS @ 6300 s$^{-1}$ (g) |
|---|---|---|---|---|---|---|---|---|
| Comp. 1 | Comp. 1 | 1-butanol | single | bimetallic | 17 | 0.959 | 0.37 | 0.51 |
| Comp. 2 | Comp. 2 | 1-butanol | single | bimetallic | 19 | 0.956 | 0.35 | 0.57 |

TABLE 2-continued

| Resin (Polym. Ex. No.) | Catalyst Prep. Example No. | Ti Catalyst Comp. Modifier | Reactor Type | Catalyst Type | Polymer F1 (g/10 min) | Polymer Density (g/cm³) | ADS @ 210 s⁻¹ (g) | ADS @ 6300 s⁻¹ (g) |
|---|---|---|---|---|---|---|---|---|
| 14 | 14 | benzaldehyde | single | bimetallic | 15 | 0.955 | 0.35 | 0.68 |
| 15 | 15 | benzaldehyde | single | bimetallic | 14 | 0.954 | | 0.72 |
| 16 | 16 | benzaldehyde | single | bimetallic | 17 | 0.952 | | 0.72 |
| 17 | 17 | benzaldehyde | single | bimetallic | 22 | 0.955 | 0.38 | 0.76 |
| 18 | 18 | benzaldehyde | single | bimetallic | 47 | 0.952 | 0.37 | 0.80 |
| 19 | 17 | benzaldehyde | single | bimetallic | 32 | 0.957 | | 0.84 |
| A[1] | N/A | N/A | single | Cr | 31 | 0.954 | 0.43 | 0.79 |
| B[2] | N/A | N/A | single | Cr | 41 | 0.954 | 0.40–0.46 | 0.72–0.77 |
| C[3] | N/A | N/A | single | Cr | 22 | 0.955 | 0.42 | 0.77 |
| D[4] | N/A | N/A | single | Cr | 21 | 0.954 | 0.44 | 0.83 |
| E[5] | N/A | N/A | tandem | Ziegler | 31 | 0.959 | 0.33 | 0.66 |
| F[6] | N/A | N/A | tandem | Ziegler | 30 | 0.957 | 0.38 | 0.84 |
| G[7] | N/A | N/A | tandem | Ziegler | 25 | 0.954 | 0.32 | 0.57 |

[1]Resin HYA 600 available from ExxonMobil Chemical Co.
[2]Resin HYA 301 available from ExxonMobil Chemical Co.
[3]Resin HD5502GA available from BP-AMOCO
[4]Resin 5502 available from Fina
[5]Resin DH 5973 available from PCD
[6]Resin GF 4670 available from Hoechst
[7]Resin BC 80 available from Enichem The results summarized in Table 2 were obtained from the resins produced in a single reactor according to the present invention (Polymerization Examples 14–19), form commercial blow molding resins produced using Cr-based catalysts in a single reactor (Samples A, B, C, and D), and from commercial bimodal MWD blow molding samples produced using Ziegler-type catalysts in tandem reactor processes (Samples E, F, and G). For commercial blow molding applications, optimum Annular Die Swell (ADS) is in the range 0.70–0.79 g at a shear rate of 6300 s⁻¹ and 0.37–0.40 g at a shear rate of 210 s⁻¹. The commercial unimodal MWD samples (A–D) in Table 2 show that this range of ADSs is commercially significant. Sample B (HYA 301) is an example of a commercially available resin produced from a single metal catalyst in a single reactor, which has been post-reactor modified to produce a commercially required swell.

Samples E, F and G are examples of commercially available bimodal MWD resins that have been produced in tandem reactor processes. Bimodal MWD resins produced in tandem reactor processes offer advantages over unimodal MWD resins produced commercially in a single reactor, e.g., for blow molding applications. Bimodal resins typically offer much improved balance of Environmental Stress Crack Resistance (ESCR) and stiffness compared with unimodal resins (i.e., bimodal MWD resins typically have much higher ESCR than unimodal resins of the same density). However, bimodal resins produced in tandem reactor processes using Ziegler catalysts often suffer from low resin swell. This is illustrated by Samples E and G.

The resins produced according to Comparative Polymerization Examples 1 and 2 show that resins having a bimodal MWD produced in a single reactor with a bimetallic Ti/Zr catalyst on a support treated with an organomagnesium component and an alcohol (1-butanol) suffer from lower than optimum ADS at the high shear rate of 6300 s⁻¹.

The resins produced according to Polymerization Examples 14–19 illustrate the present invention. Particularly, by changing the formulation of the components of the bimetallic catalyst, one can control the swell properties of the resins produced in a single reactor, and it is possible to produce bimodal MWD resins in a single reactor that have resin swell properties in the optimum range for commercial blow molding resins. Specifically, when a carbonyl-containing component such as benzaldehyde is used as the modifier in the Ti catalyst component formulation in place of an alcohol such as 1-butanol, the ADS of the bimodal resin produced by the corresponding Ti/Zr catalyst increases significantly.

Moreover, Comparative Polymerization Example 2, which employs 1-butanol as Ti catalyst component modifier like Comparative Polymerization Example 1, but employs the same Zr catalyst component as Polymerization Examples 14–19, illustrates that changing the Zr catalyst component has a much smaller effect on the resulting resin swell properties.

Comparative Catalyst Preparation Example 3

Under an inert atmosphere of dry nitrogen, silica (Davison 955, 367 g), previously calcined for 4 hours at 600° C. under dry nitrogen, and isohexane (3600 mL) were added to a 2 gallon (7.6 L) glass vessel containing a stirring paddle. The stirring rate was set to 100 rpm, and the temperature of the silica/isohexane slurry was raised to 51–54° C. for the following reagent addition and drying steps. Next, dibutylmagnesium (0.264 mol, 265.3 g of a 2.42 wt % Mg solution in heptane) was added to the stirred silica slurry. After stirring at 54° C. for 2 hours, 1-butanol (0.251 mol, 18.6 g) was added to the stirred reaction mixture. After stirring for another two hours, titanium tetrachloride (0.160 mol, 30.3 g) was added to the stirred reaction mixture, and stirring was continued for 2 hours. The liquid phase was then removed by evaporation under nitrogen purge, to yield a free-flowing powder.

Comparative Catalyst Preparation Example 4

Under an inert atmosphere of dry nitrogen, silica (Crosfield ES70, 130 g), previously calcined for 4 hours at 600° C. under dry nitrogen, and isohexane (780 mL) were added to a 2 liter round-bottom flask fitted with a paddle stirrer. The flask was placed in a 54° C. oil bath, and the slurry was stirred vigorously. Next, dibutylmagnesium (0.0936 mol, 89.1 mL of a 1.05 M solution in heptane) was added dropwise to the stirred silica slurry at 54° C. over 20 minutes. After stirring at 54° C. for another 50 minutes, benzaldehyde (0.0936 mol, 9.93 g, diluted with 40 mL isohexane) was added dropwise to the stirred reaction mixture over 10 minutes. After stirring at 54° C. for another 50 minutes, titanium tetrachloride (0.0663 mol, 12.6 g, diluted with 40 mL isohexane) was added dropwise to the stirred reaction mixture over 10 minutes, and stirring was continued for 50 minutes at 54° C. The liquid phase was then removed by evaporation under nitrogen purge at 54° C., to yield a freef-lowing yellow powder.

Comparative Catalyst Preparation Example 5

Under an inert atmosphere of dry nitrogen, silica (Davison 955, 528 g), previously calcined for 4 hours at 600° C. under dry nitrogen, and isohexane (3200 mL) were added to a 2 gallon (7.6 L) glass vessel fitted with a paddle stirrer. The stirring rate was set to 100 rpm, and the temperature of the silica/isohexane slurry was raised to 52–56° C. for the following reagent addition and drying steps. Next, dibutylmagnesium (0.380 mol, 362 mL of a 1.05 M solution in heptane) was added to the stirred silica slurry. After stirring for 1 hour, p-tolualdehyde (0.380 mol, 45.7 g, diluted with 200 mL isohexane) was added to the stirred reaction mixture. After stirring for another hour, titanium tetrachloride (0.269 mol, 51.1 g, diluted with 200 mL isohexane) was added to the stirred reaction mixture, and stirring was continued for 1 hour. The liquid phase was then removed by evaporation under nitrogen purge at 54° C., to yield a free-flowing yellow powder.

Catalyst Preparation Example 19

Under an inert atmosphere of dry nitrogen, 2.0 g of the titanium-containing catalyst component prepared using a procedure similar to that described in Comparative Catalyst Preparation Example 3, and isohexane (20 mL) were added to a Schlenk flask containing a magnetic stirring bar. The Schlenk flask was then placed in a 55° C. oil bath for the following reagent addition and drying steps. A solution was prepared by mixing $Cp_2ZrCl_2$ (0.73 mmol, 0.213 g) and MAO (80.0 mmol Al, 17.5 mL of a 4.57 M solution in toluene) in a serum bottle at ambient temperature, under an inert atmosphere of dry nitrogen. Then 3.5 mL of this solution was added dropwise to the stirred titanium catalyst component/isohexane slurry at 55° C. over a period of 5 minutes. After stirring for an additional 20 minutes at 55° C., the liquid phase was removed by evaporation under nitrogen purge to yield a free-flowing brown powder.

Catalyst Preparation Example 20

The catalyst was prepared in a two-step process:

STEP 1: Under an inert atmosphere of dry nitrogen, silica (Crosfield ES70, 130 g), previously calcined for 4 hours at 600° C. under dry nitrogen, and isohexane (780 mL) were added to a 2 liter round-bottom flask fitted with a paddle stirrer. The flask was placed in a 54° C. oil bath, and the slurry was stirred vigorously. Next, dibutylmagnesium (0.0936 mol, 89.1 mL of a 1.05 M solution in heptane) was added dropwise to the stirred silica slurry at 54° C. over 20 minutes. After stirring at 54° C. for another 50 minutes, benzaldehyde (0.0936 mol, 9.93 g, diluted with 40 mL isohexane) was added dropwise to the stirred reaction mixture over 10 minutes. After stirring at 54° C. for another 50 minutes, titanium tetrachloride (0.0663 mol; 12.6 g, diluted with 40 mL isohexane) was added dropwise to the stirred reaction mixture over 10 minutes, and stirring was continued for 50 minutes at 54° C. The liquid phase was removed by evaporation under nitrogen purge at 54° C., to yield a free-flowing yellow powder.

STEP 2: Under an inert atmosphere of dry nitrogen, 139 g of the titanium-containing catalyst component described in Step 1 above, and isohexane (700 mL) were added to a 3 L round-bottom flask fitted with a paddle stirrer. The flask was placed in a 54° C. oil bath, and the slurry was stirred vigorously. A solution was prepared by mixing $Cp_2ZrCl_2$ (8.11 mmol, 2.37 g) and MAO (0.97 mol Al, 196 g of a 13.4 wt % Al solution in toluene) in a Schlenk flask at ambient temperature, under an inert atmosphere of dry nitrogen. This solution was then added dropwise to the stirred titanium catalyst component/isohexane slurry, which was kept at 54° C., over a period of 130 minutes. The liquid phase was removed by evaporation under nitrogen purge at 54° C., to yield a free-flowing brown powder.

Catalyst Preparation Example 21

Under an inert atmosphere of dry nitrogen, 525 g of the titanium-containing catalyst component described in Comparative Catalyst Preparation Example 4 above, and isohexane (3150 mL) were added to a 2 gallon (7.6 L) glass vessel containing a stirring paddle. The stirring rate was set to 100 rpm, and the temperature of the vessel was raised to 50–56° C. for the following addition and drying steps. A solution was prepared by mixing $Cp_2ZrCl_2$ (30.7 mmol, 8.96 g) and MAO (3.68 mol Al, 740 g of a 13.4 wt % Al solution in toluene) in a stainless-steel Hoke bomb at ambient temperature, under an inert atmosphere of dry nitrogen. This solution was then added to the stirred titanium catalyst component/isohexane slurry at ambient temperature, over a period of 60 minutes. After stirring at 56° C. for an additional 40 minutes, the liquid phase was removed by evaporation under nitrogen purge to yield a freef-lowing brown powder.

Polymerization Experiments for Comparative Catalyst Preparation Examples 3–5 and Catalyst Preparation Examples 19–21

The polymerization experiments for Comparative Catalyst Preparation Examples 3–5 and Catalyst Preparation Examples 19–21 were performed using the same procedure under a standard set of reaction conditions. A typical example is described below.

A 3.8 liter stainless steel autoclave, equipped with a paddle stirrer, and under a slow nitrogen purge at 50° C. with stirring set to 300 rpm, was charged with 1500 mL of dry heptane, 1.4 mmol (1.0 mL of a 1.4 M solution in heptane) of trimethylaluminum (TMA), and 60 mL of 1-hexene. The reactor vent was closed and the stirring speed set to 900 rpm, and the internal temperature was raised to 95° C., whereafter the internal pressure was raised from 10 psi (69 kPa) to 16 psi (110 kPa) by addition of hydrogen. Ethylene was introduced into the reactor and the internal pressure was increased to 225 psi (1.55 MPa). Finally, approximately 0.050 g of the catalyst (catalyst precursor) was added to the autoclave. The reactor pressure was maintained at 220–225 psi (1.52–1.55 MPa) for 60 minutes by addition of ethylene, after which time the ethylene flow to the reactor was stopped and the reactor was cooled to room temperature and vented to the atmosphere. The contents of the autoclave were removed, and all solvents were removed from the product by evaporation, to yield the polyethylene resin (ethylene/1-hexene copolymer) product.

The results of these experiments are summarized in Table 3.

TABLE 3

| Catalyst Prep. Example | Metal in Catalyst | Modifier in Catalyst | Amount of Catalyst (Catalyst Precursor) (g) | PE Product Yield (g) | PE Mw/Mn produced by Ti-only Catalyst Component |
|---|---|---|---|---|---|
| Comp. 3 | Ti-only | 1-Butanol | 0.0504 | 187.8 | 3.5 |
| Comp. 4 | Ti-only | Benzaldehyde | 0.0511 | 164.5 | 5.0 |
| Comp. 5 | Ti-only | p-Tolualdehyde | 0.0568 | 157.4 | 4.8 |
| 19* | Ti/Zr | 1-Butanol | 0.1026 | 189.4 | 5.0 |
| 20 | Ti/Zr | Benzaldehyde | 0.0545 | 70.8 | 6.2 |
| 21* | Ti/Zr | p-Tolualdehyde | 0.0982 | 113.9 | 7.1 |

*Polymerizations performed in 2 gallon (7.6 L) autoclave; solvent and reagent amounts were scaled accordingly, to maintain reaction conditions comparable to those of the 1 gallon (3.8 L) autoclave experiments.

Table 3 shows the polydispersity (Mw/Mn) of the resins produced by the Ti-only catalyst components that employ (a) 1-butanol, (b) benzaldehyde, or (c) p-tolualdehyde as modifiers in the preparation. Table 3 also shows the effect on the polydispersity of the high molecular weight (HMW) polymer component produced by the same Ti catalyst components in the finished bimetallic catalysts.

In each case, the polymers were produced under the same polymerization, conditions. The polydispersity of the polymer produced by the Ti-only components was determined directly from the GPC chromatograms of the polymer. The polydispersity of the HMW polymer component produced by the Ti catalyst components of the bimetallic catalysts was determined by the GPC deconvolution methods described previously.

Table 3 shows that when the 1-butanol "modifier" in the Ti catalyst component formulation is replaced with benzaldehyde or p-tolualdehyde, the Mw/Mn of the resin produced by the Ti catalyst component increases.

Table 3 also shows that incorporating the same Ti catalyst components into a Ti/Zr bimetallic catalyst, by treatment with a solution prepared by mixing $Cp_2ZrCl_2$ and MAO, in each case also increases Mw/Mn of the polymer produced compared to that of the polymer prepared with the Ti-only component. GPC deconvolution of the resins produced by the Ti/Zr bimetallic catalysts indicates that the HMW polymer components typically have Mw/Mn of around 5 for the 1butanol modified Ti catalyst components, compared with Mw/Mn of around 6 to 8 for the polymer produced from the benzaldehyde and p-tolualdehyde modified Ti catalyst components in the finished bimetallic catalysts.

Bimodal polyethylene (PE) resins produced by bimetallic Ti/Zr catalyst systems in which the Ti catalyst component includes benzaldehyde as the modifier show significantly improved resin swell properties compared with PE resins produced by bimetallic Ti/Zr catalyst systems in which the Ti catalyst component used 1-butanol as the modifier. This higher resin swell may result from the broader polydispersity of the HMW polymer component produced by the benzaldehyde-modified Ti catalyst component, compared with the 1-butanol modified Ti catalyst component.

The following references are incorporated herein by reference in their entirety for all jurisdictions in which such incorporation is permitted: U.S. Pat. Nos. 5,032,562; 5,539,076; 5,614,456; 5,260,245; 4,173,547; 6,001,766; 4,001,382; 4,302,566; 4,481,301; and 5,525,678; T. E. Nowlin et al., "Ziegler-Natta Catalysts on Silica for Ethylene Polymerization," *J. Polym. Sci., Part A: Polymer Chemistry*, vol. 29, 1167–1173 (1991); and Proceedings of the SPE 48th Annual Technical Conference, 1990, pp. 1612–1616.

What is claimed is:

1. A process for making a supported bimetallic catalyst suitable for use in the production of homopolymers and copolymers of ethylene with a bimodal molecular weight distribution in a single reactor, the process comprising:

(A) contacting a support material with an organomagnesium component;

(B) contacting the contact product of (A) with an aldehyde having the general formula (II):

$$R^3—CO—R^4 \qquad (II)$$

wherein $R^4$ is a hydrogen, and $R^3$ is selected from the group consisting of aliphatic groups containing 1 to 10 carbon atoms, and aromatic groups containing 6 to 12 carbon atoms;

(C) contacting the contact product of (B) with a non-metallocene transition metal component to obtain a catalyst intermediate; and (D) contacting the catalyst intermediate with at least one aluminoxane component and a metallocene component.

2. The process of claim 1, wherein the support material comprises a solid, particulate material.

3. The process of claim 2, wherein the support material comprises silica.

4. The process of claim 2, wherein: the organomagnesium component comprises at least one dialkylmagnesium compound of the general formula (I):

$$R^1_m MgR^2_n \qquad (I)$$

where $R^1$ and $R^2$ are the same or different alkyl groups containing 2 to 12 carbon atoms and m and n are each 0, 1 or 2, provided that the sum (m+n) is equal to the valence of Mg; the aldehyde comprises a compound of the general formula (II):

$$R^3—CO—R^4 \qquad (II)$$

wherein $R^4$ is hydrogen and $R^3$ is selected from aliphatic groups containing 1 to 10 carbon atoms, and aromatic groups containing 6 to 12 carbon atoms; the metallocene component comprises at least one compound of the general formula (III):

$$Cp_xMA_y \qquad (III)$$

wherein x is at least 1, M is titanium, zirconium or hafnium, Cp represents optionally substituted cyclopentadienyl, optionally substituted cyclopentadienyl that is part of a bicycle or tricyclic moiety or, when x is 2, the cyclopentadienyl moieties may be linked by a bridging group, each A is independently selected from a halogen atom, hydrogen atom, alkyl group and combinations thereof, and the sum (x+y) is equal to the valence of M; and the aluminoxane component comprises methylaluminoxane (MAO), modified methylaluminoxanes (MMAO) or mixtures thereof.

5. The process of claim 4, wherein the alkyl groups $R^1$ and $R^2$ each contain 4 to 8 carbon atoms.

6. The process of claim 1, wherein the dialkylmagnesium component comprises dibutylmagnesium.

7. The process of claim 1, wherein the aldehyde comprises at least one compound selected from benzaldehyde, p-tolualdehyde, salicylaldehyde, butyraldehyde, 2-pentanone and 3'-methylacetophenone.

8. The process of claim 4, wherein the non-metallocene transition metal component comprises at least one compound containing a Group IV or V transition metal.

9. The process of claim 8, wherein the Group IV or V transition metal is at least one of titanium and vanadium.

10. The process of claim 8, wherein the non-metallocene transition metal component comprises halogen.

11. The process of claim 9, wherein the non-metallocene transition metal component comprises a tetravalent titanium compound.

12. The process of claim 11, wherein the non-metallocene transition metal component comprises titanium tetrachloride.

13. The process of claim 4, wherein M in general formula (III) is zirconium.

14. The process of claim 4, wherein A in general formula (III) represents halogen.

15. The process of claim 4, wherein x in general formula (III) is 2.

16. The process of claim 4, wherein Cp is unsubstituted cyclopentadienyl.

17. The process of claim 4, wherein Cp represents cyclopentadienyl substituted by an alkyl group containing 1 to 5 carbon atoms.

18. The process of claim 17, wherein Cp is n-butylcyclopentadienyl.

19. The process of claim 4, wherein the metallocene component includes at least one compound selected from bis(cyclopentadienyl) zirconium dichloride and bis(n-butylcyclopentadienyl)zirconium dichloride.

20. The process of claim 4, wherein the aluminoxane component is MAO.

21. The process of claim 4, wherein the molar ratio of organomagnesium component to aldehyde ranges from 1:5 to 15:1.

22. The process of claim 21, wherein the atomic ratio of Mg in the organomagnesium component to transition metal in the non-metallocene transition metal component ranges from 0.5:1 to 5:1.

23. The process of claim 22, wherein the atomic ratio of transition metal in the non-metallocene transition metal component to metal in the metallocene component ranges from 1:1 to 30:1.

24. The process of claim 23, wherein the atomic ratio of metal in the metallocene component to Al in the aluminoxane component ranges from 1:10 to 1:1000.

25. A process for making a supported bimetallic catalyst suitable for use in the production of homopolymers and copolymers of ethylene with a bimodal molecular weight distribution in a single reactor, said process comprising:

(A) providing a slurry in non-polar solvent of silica calcined at a temperature from 200° to 850° C.;

(B) adding a dialkylmagnesium component to the slurry according to (A), wherein the alkyl groups of the dialkylmagnesium component each contain 4 to 8 carbon atoms;

(C) adding at least one aldehyde selected from benzaldehyde, p-tolualdehyde, salicylaldehyde, butyraldehyde, 2-pentanone and 3'-methylacetophenone to a slurry according to (B), the amount of added aldehyde being such as to afford a molar ratio of dialkylmagnesium component to aldehyde of 1:1 to 2:1;

(D) adding titanium tetrachloride to a slurry according to (C) to obtain a slurry of a catalyst intermediate in a non-polar solvent; (E) removing liquid phase from a slurry according to (D) to obtain a substantially dry, free-flowing catalyst intermediate;

(F) contacting a zirconocene component and methylaluminoxane in an aromatic solvent to provide a solution;

(G) providing a slurry of the catalyst intermediate in a non-polar solvent;

(H) combining a slurry according to (G) with a solution according to (F) to obtain a slurry of bimetallic catalyst; and (I) recovering the bimetallic catalyst from the slurry obtained according to (H) by separating the liquid phase from the solid component.

* * * * *